US011538284B2

(12) United States Patent
Nishimura et al.

(10) Patent No.: US 11,538,284 B2
(45) Date of Patent: Dec. 27, 2022

(54) INFORMATION PROCESSING APPARATUS AND METHOD, AND PROGRAM

(71) Applicant: SONY CORPORATION, Tokyo (JP)

(72) Inventors: Hiroaki Nishimura, West New York, NJ (US); Nikolaos Georgis, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 303 days.

(21) Appl. No.: 16/880,412

(22) Filed: May 21, 2020

(65) Prior Publication Data

US 2021/0019957 A1 Jan. 21, 2021

Related U.S. Application Data

(60) Provisional application No. 62/875,777, filed on Jul. 18, 2019.

(51) Int. Cl.

*G07B 15/02* (2011.01)
*G06Q 10/02* (2012.01)
*G06V 10/40* (2022.01)
*G06V 20/52* (2022.01)
*G06V 20/62* (2022.01)
*G06V 30/10* (2022.01)

(52) U.S. Cl.

CPC ............. *G07B 15/02* (2013.01); *G06Q 10/02* (2013.01); *G06V 10/40* (2022.01); *G06V 20/52* (2022.01); *G06Q 2240/00* (2013.01); *G06V 20/625* (2022.01); *G06V 30/10* (2022.01)

(58) Field of Classification Search

CPC ..................................................... G07B 15/02
USPC ............................................................ 705/5
See application file for complete search history.

(56) References Cited

U.S. PATENT DOCUMENTS

2018/0268238 A1* 9/2018 Khan ..................... G06F 16/51

FOREIGN PATENT DOCUMENTS

JP 2008-176472 A 7/2008
JP 4973341 B2 7/2012

OTHER PUBLICATIONS

Hikvision, A Smart Guard That Never Sleeps Smart Parking Areas Solution, https://bsk-ag.ch/wp-content/uploads/2018/11/Smart-Parking-Areas-Solution.pdf (Year: 2018).*

* cited by examiner

*Primary Examiner* — Joel W Fosselman
(74) *Attorney, Agent, or Firm* — Oblon, McClelland, Maier & Neustadt, L.L.P.

(57) ABSTRACT

An information processing apparatus includes an entry and leaving management unit configured to analyze a captured image and detect vehicle information included in the captured image, and in a case where there is reservation information of parking corresponding to the detected vehicle information, open a gate of a parking lot corresponding to the reservation information.

20 Claims, 34 Drawing Sheets

INFORMATION PROCESSING APPARATUS AND METHOD, AND PROGRAM

CROSS REFERENCE TO RELATED APPLICATIONS

This application claims the benefit of U.S. Provisional Application No. 62/875,777, filed on Jul. 18, 2019, the entire contents of which is incorporated herein by reference.

TECHNICAL FIELD

The present disclosure relates to an information processing apparatus and method, and a program, and more particularly to an information processing apparatus and method, and a program for enabling parking lot reservation management.

BACKGROUND ART

In recent years, a method of recognizing a vehicle registration number written on a license plate attached to a vehicle from a captured image of the vehicle has been devised (for example, see PTL 1). Furthermore, a method of recognizing a vehicle registration number and managing entry and leaving of the vehicle using the recognized vehicle registration number in a parking lot or the like has been devised (for example, see PTL 2).

CITATION LIST

Patent Literature

[PTL 1]
JP 4973341B
[PTL 2]
JP 2008-176472A

SUMMARY

Technical Problem

However, in the conventional methods, parking lot reservation management using the recognized vehicle registration number has not been able to be performed.

The present disclosure has been made in view of such a situation and is intended to enable parking lot reservation management.

Solution to Problem

An information processing apparatus according to an aspect of the present technology is an information processing apparatus including an entry and leaving management unit configured to analyze a captured image and detect vehicle information included in the captured image, and in a case where there is reservation information of parking corresponding to the detected vehicle information, open a gate of a parking lot corresponding to the reservation information.

An information processing method according to an aspect of the present technology is an information processing method including analyzing a captured image and detecting vehicle information included in the captured image, and in a case where there is reservation information of parking corresponding to the detected vehicle information, opening a gate of a parking lot corresponding to the reservation information.

A program according to an aspect of the present technology is a program for causing a computer to function as an entry and leaving management unit configured to analyze a captured image and detect vehicle information included in the captured image, and in a case where there is reservation information of parking corresponding to the detected vehicle information, open a gate of a parking lot corresponding to the reservation information.

An information processing system according to another aspect of the present technology is an information processing system including a terminal device, a server, a parking lot management device, and a gate device, the terminal device including a reservation processing unit configured to reserve, using vehicle information, parking of a vehicle corresponding to the vehicle information, the server including a reservation information management unit configured to register reservation information corresponding to the vehicle information generated by the terminal device, and supply the reservation information to the parking lot management device of a parking lot specified by the reservation information, the parking lot management device including an imaging unit configured to capture an image and generate a captured image, and an entry and leaving management unit configured to analyze the captured image and detect vehicle information included in the captured image, acquire the reservation information supplied from the server, and open a gate of the gate device in a case where there is the reservation information corresponding to the detected vehicle information in the acquired reservation information, and the gate device including a gate opening and closing unit configured to open and close the gate under control of the parking lot management device.

In the information processing apparatus and method, and the program according to an aspect of the present technology, the captured image is analyzed, the vehicle information included in the captured image is detected, and in the case where there is reservation information of parking corresponding to the detected vehicle information, the gate of the parking lot corresponding to the reservation information is opened.

In the information processing system according to another aspect of the present technology, a reservation of parking of a vehicle corresponding to vehicle information is made using the vehicle information in the terminal device, reservation information corresponding to the vehicle information generated by the terminal device is registered, and the reservation information is supplied to a parking lot management device of a parking lot specified by the reservation information in the server, and an image is captured and a captured image is generated, the captured image is analyzed and vehicle information included in the captured image is detected, the reservation information supplied from the server is acquired, and in the case where there is the reservation information corresponding to the detected vehicle information in the acquired reservation information, the gate of the gate device is opened in the parking lot management device.

DESCRIPTION OF EMBODIMENTS

Figure 1:
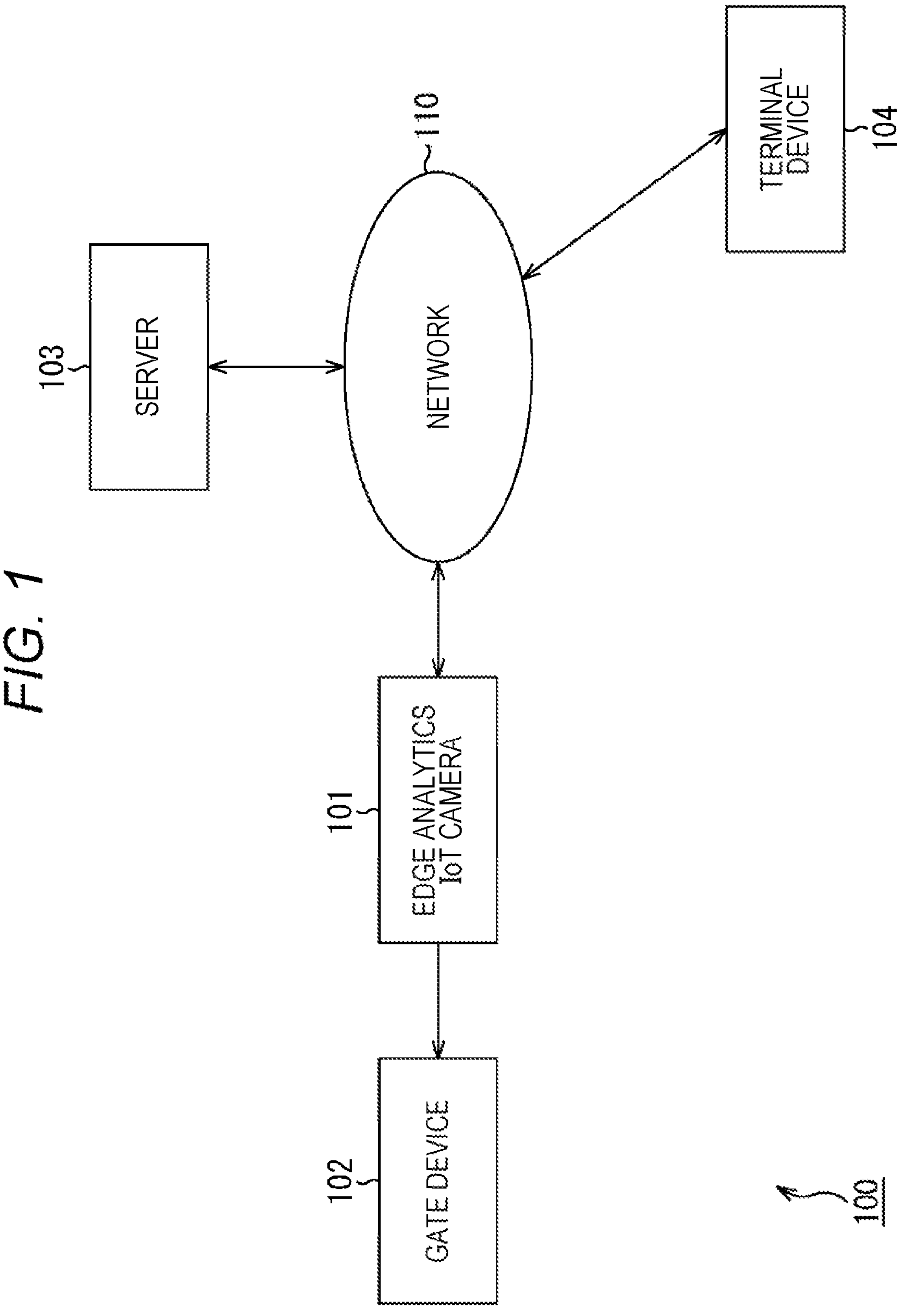
FIG. 1 is a diagram illustrating a main configuration example of a parking lot reservation system.

Hereinafter, modes for implementing the present disclosure (hereinafter referred to as embodiments) will be described. Note that the description will be given in the following order.

1. First Embodiment (parking lot reservation system)
2. Second Embodiment (entry and leaving management based on time information)
3. Third Embodiment (provision of parking lot information)
4. Fourth Embodiment (use status management)
5. Fifth Embodiment (setting of use fee)
6. Sixth Embodiment (commerce transaction system)
7. Appendix

1. First Embodiment

<Parking Lot Reservation System>

In recent years, for example, as described in PTL 1, a method of recognizing a vehicle registration number written on a license plate attached to a vehicle from a captured image of the vehicle has been devised.

Furthermore, as described in PTL 2, a method of recognizing a vehicle registration number and managing entry and leaving of the vehicle using the recognized vehicle registration number in a parking lot or the like has been devised.

However, parking lot reservation management using the recognized vehicle registration number has not been able to be performed. To manage reservation of a parking lot, a manager or the like is prepared, and complicated work such as acceptance of a reservation and entry and leaving management based on the reservation needs to be performed by the manager. Therefore, the cost may increase.

Therefore, entry and leaving of a vehicle corresponding to reservation information is managed on the basis of vehicle information detected from a captured image. For example, a captured image is analyzed and vehicle information included in the captured image is detected, and in a case where there is reservation information of parking corresponding to the detected vehicle information, a gate of a parking lot corresponding to the reservation information is opened.

For example, an information processing apparatus includes an entry and leaving management unit that analyzes a captured image, detects vehicle information included in the captured image, and in a case where there is reservation information of parking corresponding to the detected vehicle information, opens a gate of a parking lot corresponding to the reservation information.

For example, a program causes a computer to function as an entry and leaving management unit that analyzes a captured image, detects vehicle information included in the captured image, and in a case where there is reservation information of parking corresponding to the detected vehicle information, opens a gate of a parking lot corresponding to the reservation information.

For example, in an information processing system, a terminal device reserves, using vehicle information, parking of a vehicle corresponding to the vehicle information, a server registers reservation information corresponding to the vehicle information generated by the terminal device, and supplies the reservation information to a parking lot management device of a parking lot specified by the reservation information, the parking lot management device captures an image and generates a captured image, analyzes the captured image and detects vehicle information, acquires the reservation information supplied from the server, and in a case where there is the reservation information corresponding to the detected vehicle information in the acquired reservation information, opens a gate of a gate device, and a gate device opens and closes the gate under control of the parking lot management device.

With the configuration, parking lot reservation management can be performed. Therefore, complicated work by a parking lot manager becomes unnecessary, and an increase in cost can be suppressed. Furthermore, an increase in load on the parking lot manager can be suppressed.

FIG. 1 is a block diagram illustrating an example of a main configuration of a parking lot reservation system that is a mode of an information processing system to which the present technology is applied. A parking lot reservation system 100 illustrated in FIG. 1 is a system for making a reservation of a parking lot and managing entry and leaving of a vehicle on the basis of the reservation. As illustrated in FIG. 1, the parking lot reservation system 100 includes an edge analytics IoT camera 101, a gate device 102, a server 103, and a terminal device 104.

The edge analytics IoT camera 101 and the gate device 102 are installed in the parking lot and are managed by, for example, an operator of the parking lot or the like.

The server 103 is installed at an arbitrary place and is managed by, for example, an operator of the parking lot reservation system 100 or the like. The server 103 may be implemented by, for example, cloud computing or grid computing.

The terminal device 104 is configured by, for example, a portable information processing terminal device such as a smartphone or a tablet terminal, and is owned by a user of a vehicle to be parked or the like. Note that the terminal device 104 need not be a portable information processing terminal. For example, the terminal device 104 may be an in-vehicle device such as a car navigation system mounted in an automobile.

The edge analytics IoT camera 101, the server 103, and the terminal device 104 are communicatively connected to one another via a network 110.

The network 110 is a communication network configured by an arbitrary communication medium. Communication performed via the network 110 may be wired communication, wireless communication, or both of the wired and wireless communication. That is, the network 110 may be a wired communication network, a wireless communication network, or a communication network configured by both of the wired and wireless communication networks. Furthermore, the network 110 may be configured by a single communication network or by a plurality of communication networks.

For example, the Internet may be included in the network 110. Furthermore, a public telephone line network may be included in the network 110. Moreover, a wide area communication network for a wireless mobile body such as so-called 3G line or 4G line may be included in the network 110. For example, a low power wide area (LPWA) communication network such as LTE-M capable of long-range data communication and consuming a low current may be included in the network 110. Furthermore, a wide area network (WAN), a local area network (LAN), or the like may be included in the network 110. Moreover, a wireless communication network for performing communication conforming to the Bluetooth (registered trademark) standard may be included in the network 110. Furthermore, a communication path for short-range wireless communication such as near field communication (NFC) may be included in the network 110. Moreover, a communication path for infrared communication may be included in the network 110. Furthermore, a wired communication network conforming to a standard such as high-definition multimedia interface (HDMI) (registered trademark) or a universal serial bus (USB) (registered trademark) may be included in the network 110. As described above, the network 110 may include a communication network or a communication path of any communication standard.

The edge analytics IoT camera 101, the server 103, and the terminal device 104 are each connected to the network 110 by wired communication, wireless communication, or both of the wired and wireless communication.

Furthermore, the edge analytics IoT camera 101 can transmit control information to the gate device 102. For example, the edge analytics IoT camera 101 can perform wired communication, wireless communication, or both of the wired and wireless communication with the gate device 102, and can transmit the control information by the communication. Thereby, the edge analytics IoT camera 101 can control the gate device 102.

Note that FIG. 1 illustrates one each of the devices (the edge analytics IoT camera 101 to the terminal device 104), but the respective numbers of the devices are arbitrary, and there may be a single device or may be a plurality of devices. Furthermore, the numbers of the devices may be the same or different. Moreover, the number of parking lots where the edge analytics IoT camera 101 and the gate device 102 are installed is also arbitrary, and there may be a single parking lot or a plurality of parking lots. For example, a plurality of the edge analytics IoT cameras 101 and the gate devices installed in a plurality of parking lots may be included in the parking lot reservation system 100.

In the case of providing a plurality of edge analytics IoT cameras 101, the edge analytics IoT cameras 101 may be connected to one another via wired communication or wireless communication. By being able to communicate with one another, the edge analytics IoT cameras 101 can share mutual analysis results of captured images and can efficiently manage parking lots.

<Role of Each Device>

Figure 2:
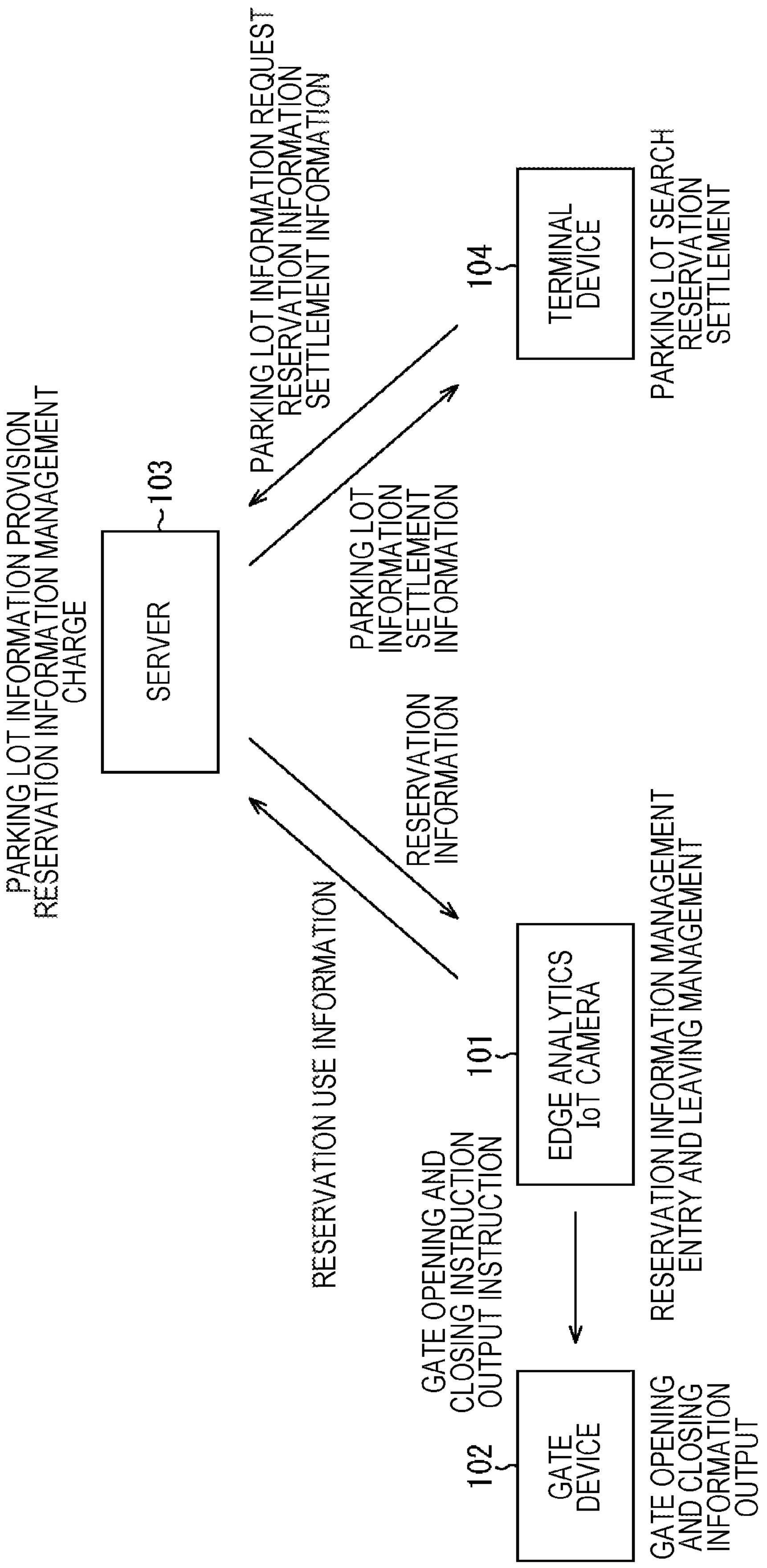
FIG. 2 is a diagram for describing processing performed by each device and examples of information exchanged between the devices.

Outline of processing performed by the devices and information exchanged among the devices is illustrated in FIG. 2. For example, when the terminal device 104 requests the server 103 to send parking lot information on the basis of a user operation or the like, the server 103 returns, as a response, parking lot information that is information regarding reservable parking lots. The user of the terminal device 104 selects a desired parking lot from among the reservable parking lots searched as described above, inputs necessary information such as vehicle information regarding a vehicle to be parked, and makes a reservation.

Note that, in the present specification, a vehicle is an arbitrary moving object for transporting people and goods, such as an automobile, a bus, a truck, a motorcycle, a motorbike, or a bicycle. Furthermore, for example, ships, aircrafts, electric trains (including railway trains, etc.), and the like may be targeted instead of vehicles. Furthermore, in the present specification, the vehicle information is information regarding a vehicle, and includes at least a vehicle registration number. The vehicle registration number indicates an identification number or the like written on a license plate. The license plate is a plate for writing an identification number or the like for managing a vehicle registered in a country, a local government, or the like. The license plate includes, for example, an automobile registration number mark for displaying an automobile registration number, a vehicle number mark and a sign for displaying a vehicle number, and the like in Japan. Furthermore, the license plate includes a license plate in the United States and the like. That is, the vehicle registration number includes the above-described automobile registration number, vehicle number, sign, and the like. Note that, in practice, not only numbers but also letters, symbols, and the like can be written on the license plate. In the following, numerals, characters, symbols, and the like described on a license plate will be described as "characters" without distinguishing them from one another unless otherwise specified. Furthermore, the above-mentioned vehicle registration number (automobile registration number, vehicle number, sign, or the like) may include not only numerals but also characters, symbols, and the like.

Furthermore, the vehicle information may include information such as a vehicle name, a vehicle type, a model type, a vehicle color, and the like, or may include information regarding appearance characteristics such as scratches.

When the vehicle information, information regarding a reservation such as specification of a parking lot and date and time, information regarding the user such as a name and contact information, information regarding settlement such as a payment method, and the like are input, the terminal device 104 generates reservation information including such input information and supplies the reservation information to the server 103. When acquiring the reservation information, the server 103 registers and manages the reservation information in a database. Furthermore, the server 103 supplies the reservation information to the edge analytics IoT camera 101 installed in the parking lot corresponding to the reservation information.

The edge analytics IoT camera 101 acquires the reservation information of the parking lot from the server 103, captures an image of a vehicle approaching the gate device 102, specifies vehicle information of the vehicle from the captured image, and causes the gate device 102 to open a gate in a case of determining that the vehicle information corresponds to the reservation information (the vehicle is a reserved vehicle). Note that the vehicle to be reserved is also referred to as a reserved vehicle.

When acquiring the reservation information, the edge analytics IoT camera 101 registers and manages the reservation information in the database. The edge analytics IoT camera 101 captures an image of the vehicle to enter or leave, detects the vehicle information from the captured image (for example, detects the vehicle registration number written on the license plate), and make inquiries about reservation information using the vehicle information. In a case where there is reservation information corresponding to the detected vehicle information (that is, reservation information including the same vehicle information as the detected vehicle information), the edge analytics IoT camera 101 transmits a gate opening and closing instruction to the gate device 102 to open the gate. Furthermore, the edge analytics IoT camera 101 can supply, for example, an output instruction for outputting a guidance of a parking space, a reservation time (that is, an available time), and the like to the gate device 102.

The gate device 102 opens the gate and outputs the guidance or the like under such control.

When the parked vehicle has left the parking lot, the edge analytics IoT camera 101 generates reservation use information indicating completion of the use of the reserved parking lot and supplies the reservation use information to the server 103.

When acquiring the reservation use information, the server 103 deletes the managed reservation information. Furthermore, the server 103 and the terminal device 104 perform communicate with each other and exchange settlement information, thereby performing charge processing (settlement processing) regarding the use of the reserved parking lot and exchange settlement information.

Each device performs such processing, so that the parking lot reservation system 100 can perform the parking lot reservation management. Therefore, complicated work by a parking lot manager becomes unnecessary, and an increase in cost can be suppressed. Furthermore, an increase in load on the parking lot manager can be suppressed.

<Edge Analytics IoT Camera>

Figure 3:
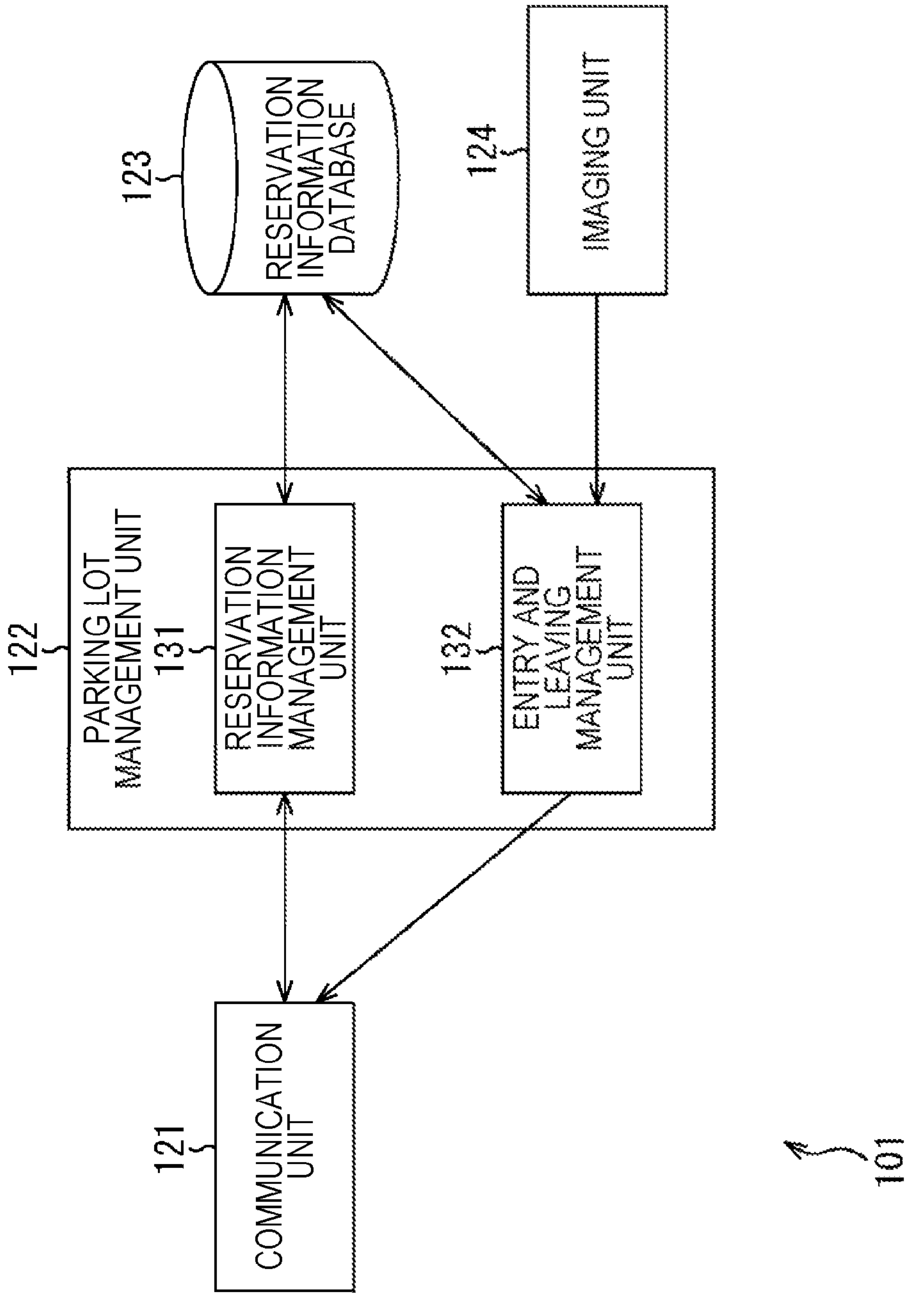
FIG. 3 is a block diagram illustrating a main configuration example of an edge analytics IoT camera.

FIG. 3 is a block diagram illustrating a main configuration example of the edge analytics IoT camera 101. Note that FIG. 3 illustrates main processing units, data flows, and the like, and those illustrated in FIG. 3 are not necessarily everything. That is, in the edge analytics IoT camera 101, there may be a processing unit not illustrated as a block in FIG. 3 or processing or data flow not illustrated as an arrow or the like in FIG. 3.

As illustrated in FIG. 3, the edge analytics IoT camera 101 has a communication unit 121, a parking lot management unit 122, a reservation information database 123, and an imaging unit 124.

The communication unit 121 performs communication with another device by an arbitrary communication method using wired communication, wireless communication, or both of the wired and wireless communication and exchanges information.

The parking lot management unit 122 performs processing regarding management of a parking lot. The parking lot management unit 122 includes, for example, a reservation information management unit 131 and an entry and leaving management unit 132. The reservation information management unit 131 acquires, for example, the reservation information supplied from the server 103 via the communication unit 121, and registers and manages the reservation information in the reservation information database 123.

The entry and leaving management unit 132 performs processing regarding management of entry and leaving of a vehicle into and from a parking lot on the basis of the reservation information read from the reservation information database 123 and the captured image generated by the imaging unit 124 or the like. For example, the entry and leaving management unit 132 analyzes the captured image, detects the vehicle information included in the captured image, searches for the reservation information of parking corresponding to the detected vehicle information, controls the gate device 102 via the communication unit 121 in a case where there is such reservation information, and opens the gate of the parking lot corresponding to the reservation information.

The reservation information database 123 is a database in which reservation information is registered, and includes an arbitrary storage medium such as a hard disk or a semiconductor memory, for example. That is, the reservation information database 123 is a reservation information storage unit that stores reservation information.

The imaging unit 124 includes a camera or the like, and captures a vehicle located near the gate device 102 and about to enter the parking lot or a vehicle located near the gate device 102 and about to leave the parking lot, using the camera as an object, and generates a captured image.

Note that each of these processing units (the communication unit 121 to the imaging unit 124) of the edge analytics IoT camera 101 can have an arbitrary configuration. For example, each processing unit may be configured by a logic circuit that implements the above-described processing. Furthermore, each processing unit may include, for example, a central processing unit (CPU), a read only memory (ROM), a random access memory (RAM), and the like, and implement the above-described processing by executing a program using the above resources. Of course, each processing unit may have both the configurations and implement part of the above-described processing by the logic circuit and implement the other of the processing by executing the program. The configurations of the processing units may be independent of one another. For example, some of the processing units may implement part of the above-described processing by the logic circuit, some of the processing units may implement the above-described processing by executing the program, and some of the processing units may implement the above-described processing by both the logic circuit and execution of the program.

<Gate Device>

Figure 4:
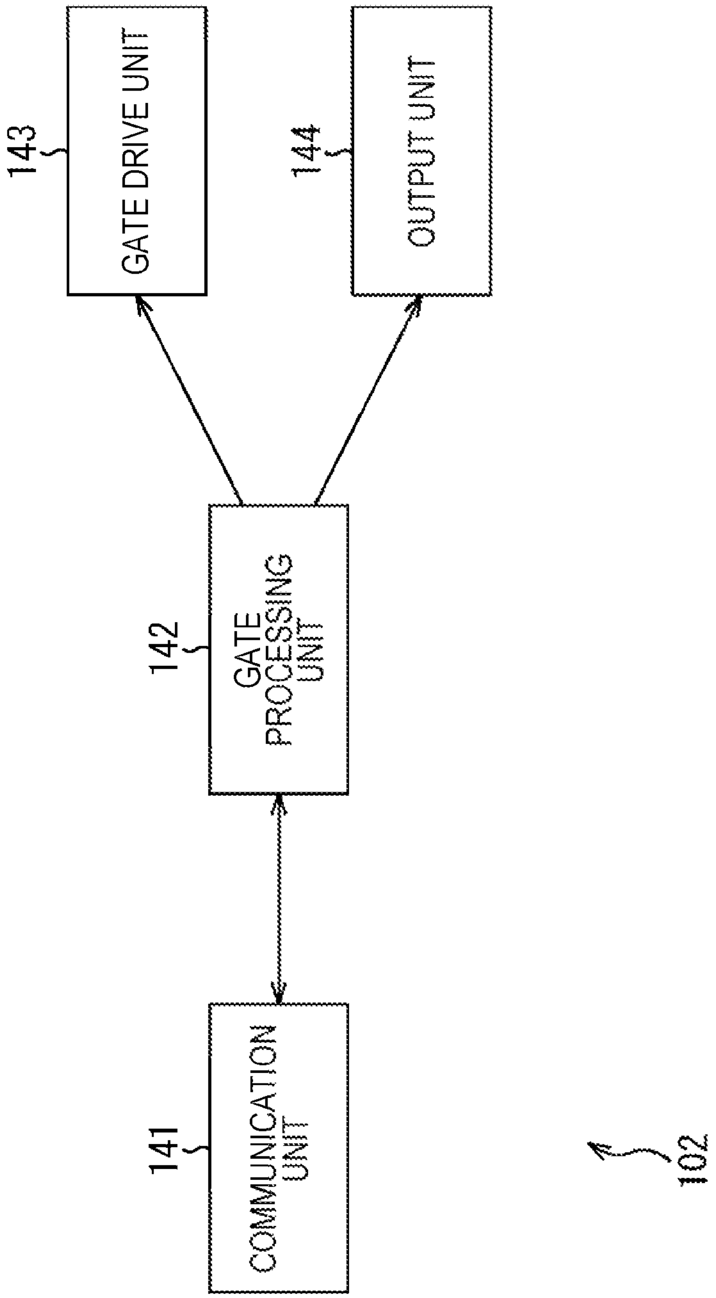
FIG. 4 is a block diagram illustrating a main configuration example of a gate device.

FIG. 4 is a block diagram illustrating a main configuration example of the gate device 102. Note that FIG. 4 illustrates main processing units, data flows, and the like, and those illustrated in FIG. 4 are not necessarily everything. That is, in the gate device 102, there may be a processing unit not illustrated as a block in FIG. 4 or processing or data flow not illustrated as an arrow or the like in FIG. 4.

As illustrated in FIG. 4, the gate device 102 includes a communication unit 141, a gate processing unit 142, a gate drive unit 143, and an output unit 144.

The communication unit 141 performs communication with another device by an arbitrary communication method using wired communication, wireless communication, or both of the wired and wireless communication and exchanges information.

The gate processing unit 142 performs processing regarding opening and closing of the gate. The gate drive unit 143 includes, for example, an actuator and controls opening and closing of the gate. Furthermore, the output unit 144 includes an information output device such as a monitor and a speaker, and outputs images and sounds. The gate processing unit 142 controls the gate drive unit 143 and the output unit 144 on the basis of the control information supplied from the edge analytics IoT camera 101 via the communication unit 141 to open and close the gate and output images and sounds for a guidance and the like.

Note that each of these processing units (the communication unit 141 to the output unit 144) of the gate device 102 can have an arbitrary configuration. For example, each processing unit may be configured by a logic circuit that implements the above-described processing. Furthermore, each processing unit may include, for example, a CPU, a ROM, a RAM, and the like, and implement the above-described processing by executing a program using the above resources. Of course, each processing unit may have both the configurations and implement part of the above-described processing by the logic circuit and implement the other of the processing by executing the program. The configurations of the processing units may be independent of one another. For example, some of the processing units may implement part of the above-described processing by the logic circuit, some of the processing units may implement the above-described processing by executing the program, and some of the processing units may implement the above-described processing by both the logic circuit and execution of the program.

<Server>

Figure 5:
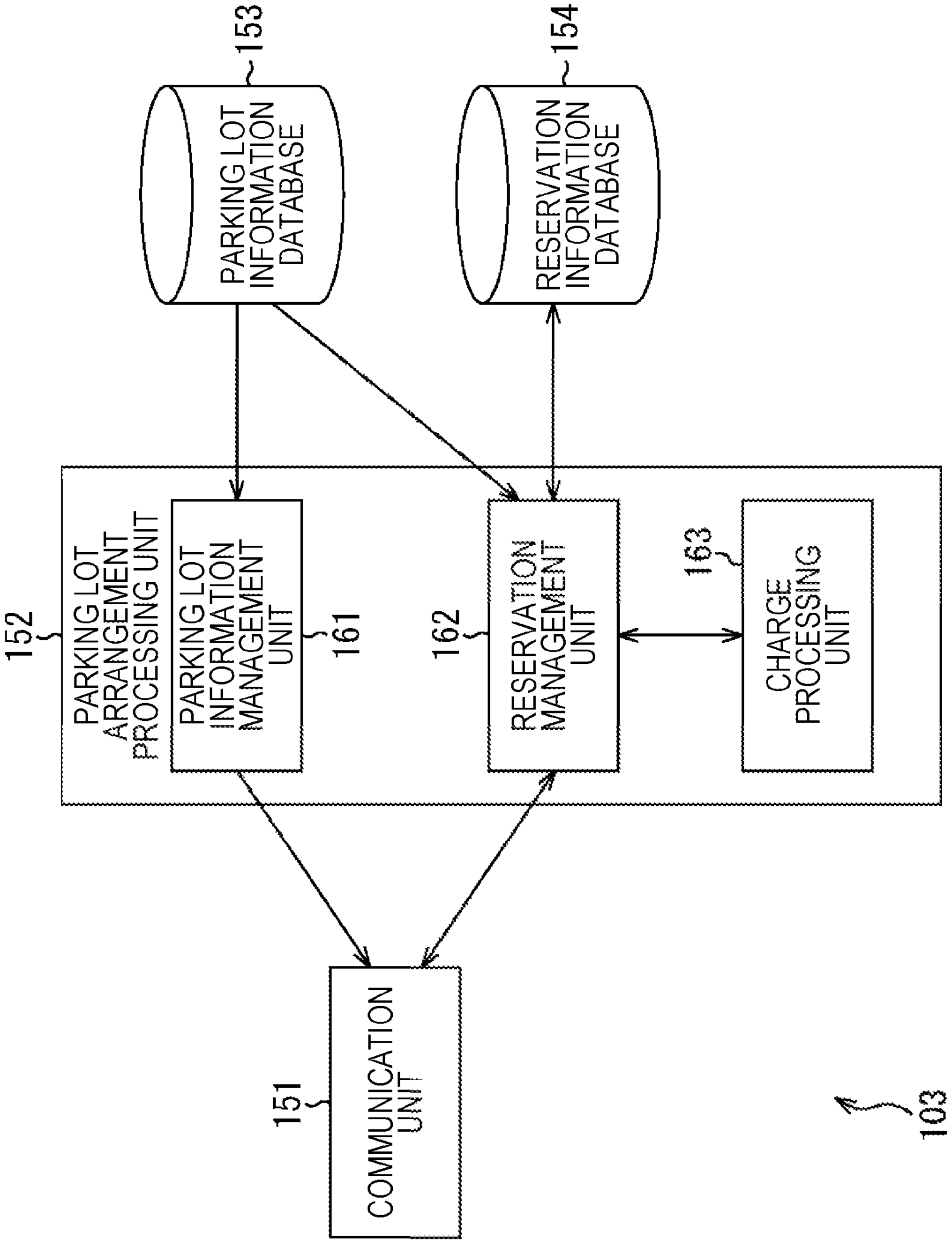
FIG. 5 is a block diagram illustrating a main configuration example of a server.

FIG. 5 is a block diagram illustrating a main configuration example of the server 103. Note that FIG. illustrates main processing units, data flows, and the like, and those illustrated in FIG. 5 are not necessarily everything. That is, in the server 103, there may be a processing unit not illustrated as a block in FIG. 5 or processing or data flow not illustrated as an arrow or the like in FIG. 5.

As illustrated in FIG. 5, the server 103 includes a communication unit 151, a parking lot arrangement processing unit 152, a parking lot information database 153, and a reservation information database 154. The communication unit 151 performs communication with another device by an arbitrary communication method using wired communication, wireless communication, or both of the wired and wireless communication and exchanges information.

The parking lot arrangement processing unit 152 performs processing regarding parking lot reservation. The parking lot arrangement processing unit 152 includes a parking lot information management unit 161, a reservation management unit 162, and a charge processing unit 163. The parking lot information management unit 161 manages parking lot information registered in the parking lot information database 153.

The reservation management unit 162 performs processing regarding management of a reservation. For example, the reservation management unit 162 registers the reservation information in the reservation information database 154, reads desired reservation information from the reservation information database 123, and supplies the reservation information via the communication unit 151. The charge processing unit 163 performs charge processing regarding use of the reservation managed by the reservation management unit 162.

The parking lot information database 153 is a database in which parking lot information is registered, and includes an arbitrary storage medium such as a hard disk or a semiconductor memory, for example. That is, the parking lot information database 153 is a parking lot information storage unit that stores the parking lot information. In the parking lot information database 153, the parking lot information regarding a parking lot that can be reserved is registered in advance.

The reservation information database 154 is a database in which reservation information is registered, and includes an arbitrary storage medium such as a hard disk or a semiconductor memory, for example. That is, the reservation information database 154 is a reservation information storage unit that stores reservation information.

Note that each of these processing units (the communication unit 151 to the reservation information database 154) of the server 103 can have an arbitrary configuration. For example, each processing unit may be configured by a logic circuit that implements the above-described processing. Furthermore, each processing unit may include, for example, a CPU, a ROM, a RAM, and the like, and implement the above-described processing by executing a program using the above resources. Of course, each processing unit may have both the configurations and implement part of the above-described processing by the logic circuit and implement the other of the processing by executing the program. The configurations of the processing units may be independent of one another. For example, some of the processing units may implement part of the above-described processing by the logic circuit, some of the processing units may implement the above-described processing by executing the program, and some of the processing units may implement the above-described processing by both the logic circuit and execution of the program.

<Terminal Device>

Figure 6:
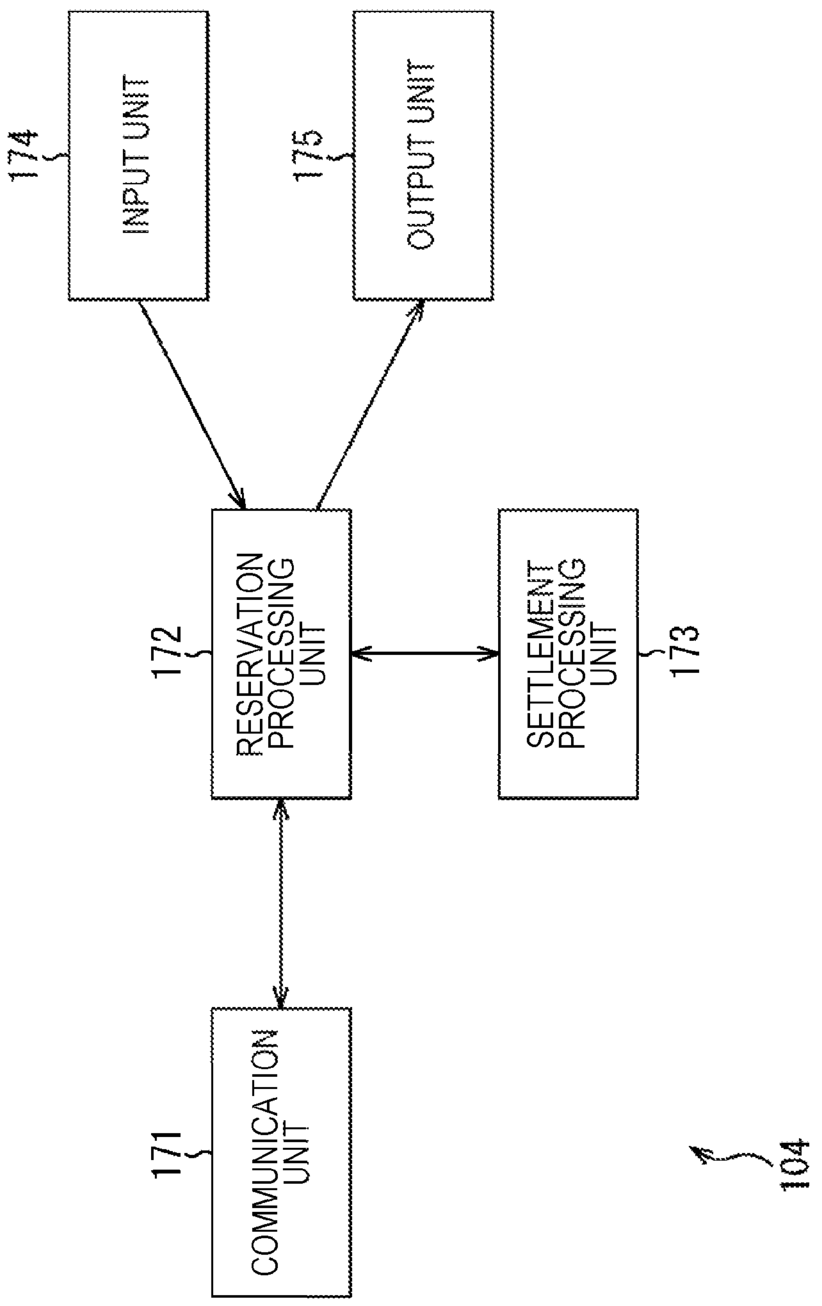
FIG. 6 is a block diagram illustrating a main configuration example of a terminal device.

FIG. 6 is a block diagram illustrating a main configuration example of the terminal device 104. Note that FIG. 6 illustrates main processing units, data flows, and the like, and those illustrated in FIG. 6 are not necessarily everything. That is, in the terminal device 104, there may be a processing unit not illustrated as a block in FIG. 6 or processing or data flow not illustrated as an arrow or the like in FIG. 6.

As illustrated in FIG. 6, the terminal device 104 includes a communication unit 171, a reservation processing unit 172, a settlement processing unit 173, an input unit 174, and an output unit 175.

The communication unit 171 performs communication with another device by an arbitrary communication method using wired communication, wireless communication, or both of the wired and wireless communication and exchanges information.

The reservation processing unit 172 performs processing regarding a reservation, such as searching for a parking lot, receiving reservation content, and generating the reservation information. The settlement processing unit 173 performs settlement processing regarding use of the reservation made by the reservation processing unit 172. The input unit 174 includes an arbitrary input device such as a keyboard, a touch panel, and a microphone, receives an operation input by the user or the like, and supplies the operation input to the reservation processing unit 172. The output unit 175 includes an arbitrary output device such as a monitor and a speaker, and outputs, for example, images and sounds supplied from the reservation processing unit 172, such as a graphical user interface (GUI) for allowing the user to input information regarding a reservation, or a guidance. Note that each of these processing units (the communication unit 171 to the output unit 175) of the terminal device 104 can have an arbitrary configuration.

For example, each processing unit may be configured by a logic circuit that implements the above-described processing. Furthermore, each processing unit may include, for example, a CPU, a ROM, a RAM, and the like, and implement the above-described processing by executing a program using the above resources. Of course, each processing unit may have both the configurations and implement part of the above-described processing by the logic circuit and implement the other of the processing by executing the program. The configurations of the processing units may be independent of one another. For example, some of the processing units may implement part of the above-described processing by the logic circuit, some of the processing units may implement the above-described processing by executing the program, and some of the processing units may implement the above-described processing by both the logic circuit and execution of the program.

<Flow of Reservation Processing>

Figure 7:
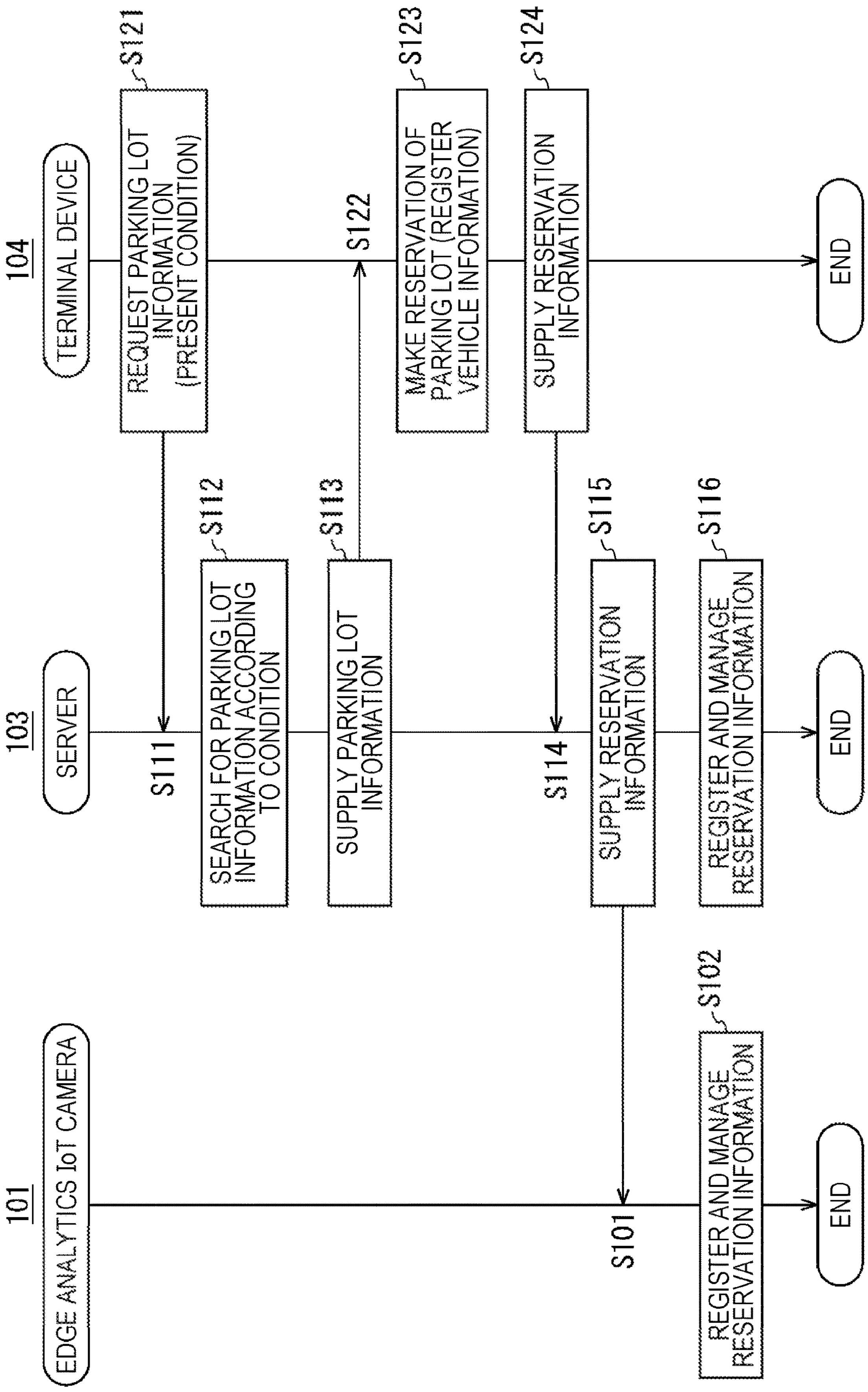
FIG. 7 is a flowchart for describing an example of a flow of reservation processing.

Next, processing executed by each device of the parking lot reservation system 100 will be described. First, an example of a flow of reservation processing of registering a parking lot reservation will be described with reference to a flowchart in FIG. 7.

In step S121, when the reservation processing is started, the reservation processing unit 172 of the terminal device 104 searches for a parking lot. For example, the reservation processing unit 172 supplies search information including a search condition to be used for a parking lot search to the server 103 via the communication unit 171, and requests the parking lot information corresponding to the search condition. This search information may have any content and may include, for example, the following information. Position information: position information of an area where a parking lot is reserved. The position information may be, for example, current position information of the information terminal obtained via a global positioning system (GPS) or the like or position information directly input by the user via the GUI of an application.

Time information: time information regarding use of a parking lot. The time information may be, for example, a reservation time start time, a reservation time end time, a total reservation time, or the like.

Range information: information indicating a distance from the position information that is regarded as a center.

Fee information: a fee per unit time, an upper limit of the fee for a reservation time, and the like.

In step S111, the parking lot information management unit 161 of the server 103 acquires the search information via the communication unit 151. In step S112, the parking lot information management unit 161 searches the parking lot information registered in the parking lot information database 153 for parking lot information corresponding to the search condition included in the search information. In step S113, when the parking lot information corresponding to the search information is found, the parking lot information management unit 161 reads the parking lot information from the parking lot information database 153 and supplies the parking lot information to the terminal device 104 via the communication unit 151.

In step S122, the reservation processing unit 172 of the terminal device 104 acquires the parking lot information via the communication unit 171. The reservation processing unit 172 supplies the parking lot information to the output unit 175 and causes the output unit 175 to output the parking lot information as images and sounds. In step S123, the reservation processing unit 172 makes a reservation of a parking lot using the parking lot information. For example, the reservation processing unit 172 receives information input by the user or the like on the basis of the parking lot information output from the output unit 175 via the input unit 174, and generates reservation information using the received information.

The reservation information includes, for example, information indicating a parking lot to be reserved.

Furthermore, for example, reservation time information such as the reservation time start time, the reservation time end time, or the total reservation time may be included. Moreover, the vehicle information such as the vehicle registration number, the vehicle type, and the vehicle color may be included. Furthermore, for example, payment information such as credit card information or a settlement application via the terminal device 104 may be included as information for payment regarding parking lot use. Moreover, these pieces of information may be transmitted to the server 103 in advance instead of being transmitted each time a reservation is made, and may be managed on the server 103.

In step S124, the reservation processing unit 172 transmits the reservation information to the server 103 via the communication unit 171. In step S114, the reservation management unit 162 of the server 103 acquires the reservation information via the communication unit 151. Then, in step S115, the reservation management unit 162 supplies the reservation information to the edge analytics IoT camera 101 installed in the parking lot to be reserved in the reservation information via the communication unit 151. Furthermore, in step S116, the reservation management unit 162 registers and manages the reservation information in the reservation information database 154. In step S101, the reservation information management unit 131 of the edge analytics IoT camera 101 acquires the reservation information supplied from the server 103 via the communication unit 121. In step S102, the reservation information management unit 131 registers and manages the obtained reservation information in the reservation information database 123.

Note that this reservation information may be transmitted from the terminal device 104 to the edge analytics IoT camera 101 without going through the server 103.

<Flow of Entry and Leaving Management Processing>

Figure 8:
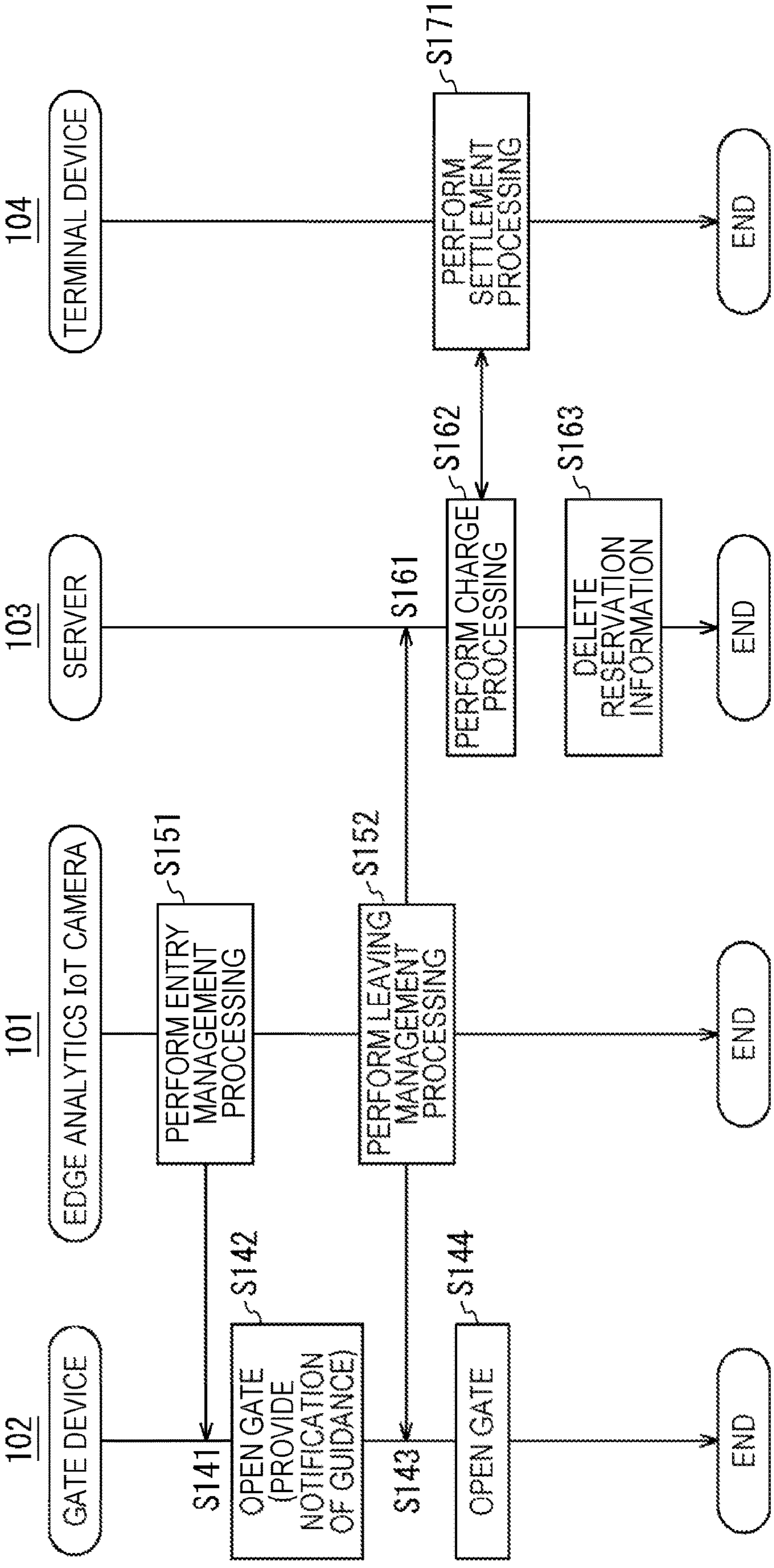
FIG. 8 is a flowchart for describing an example of a flow of entry and leaving management processing.

Next, an example of a flow of entry and leaving management processing of managing entry and leaving of a vehicle on the basis of the reservation information and the like will be described with reference to the flowchart in FIG. 8.

In step S151, when the entry and leaving management processing is started, the entry and leaving management unit 132 of the edge analytics IoT camera 101 executes entry management processing to manage entry of a reserved vehicle. This processing will be described below. In the case of opening the gate by the entry management processing, the entry and leaving management unit 132 transmits the control information to the gate device 102 via the communication unit 121. In step S141, the gate processing unit 142 of the gate device 102 acquires the control information via the communication unit 141. Then, in step S142, the gate processing unit 142 opens the gate according to the control information. At that time, the gate processing unit 142 may cause the output unit 144 to output the information regarding the reservation, a guidance about a parking space, and the like.

Furthermore, in step S152, the entry and leaving management unit 132 of the edge analytics IoT camera 101 executes leaving management processing to manage leaving of the reserved vehicle. This processing will be described below.

In the case of opening the gate by the leaving management processing, the entry and leaving management unit 132 transmits the control information to the gate device 102 via the communication unit 121. In step S143, the gate processing unit 142 of the gate device 102 acquires the control information via the communication unit 141. Then, in step S144, the gate processing unit 142 opens the gate according to the control information.

Furthermore, in step S161, in the leaving management processing, when the entry and leaving management unit 132 of the edge analytics IoT camera 101 supplies the reservation use information to the server 103 via the communication unit 121, the reservation management unit 162 of the server 103 acquires the reservation use information via the communication unit 151.

In step S162, the charge processing unit 163 of the server 103 performs communication with the terminal device 104 via the communication unit 151 on the basis of the reservation use information and performs charge processing. In step S171, in the charge processing, the settlement processing unit 173 of the terminal device 104 performs communication with the server 103 via the communication unit 171 and performs settlement processing. Furthermore, in step S163, the reservation management unit 162 of the server 103 deletes the reservation information corresponding to the reservation use information acquired in step S161 and registered in the reservation information database 154.

Note that the entry management processing in step S151 and the leaving management processing in step S152 can be executed in parallel to each other.

<Flow of Entry Management Processing>

Next, an example of a flow of the entry management processing executed in step S151 in FIG. 8 will be described with reference to the flowchart in FIG. 9.

In step S191, when the entry management processing is started, the entry and leaving management unit 132 captures a vehicle to enter near the gate device 102, using the imaging unit 124, and obtains a captured image. In step S192, the entry and leaving management unit 132 analyzes the captured image and detects the vehicle information.

For example, the entry and leaving management unit 132 detects the vehicle registration number of the vehicle included in the captured image as the vehicle information.

Figure 10A:
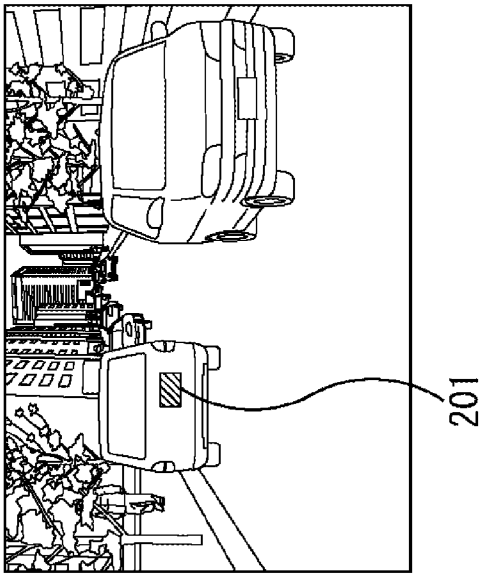
FIGS. 10A to 10D are diagrams for describing an outline of plate detection and character recognition.
Figure 10B:
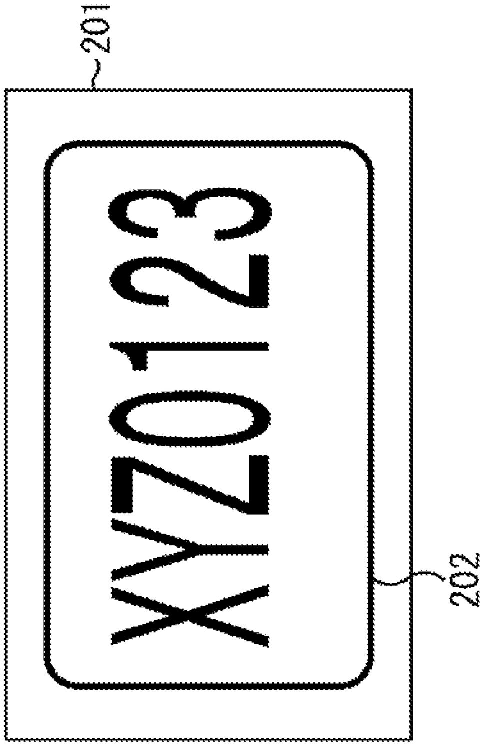
Figure 10C:
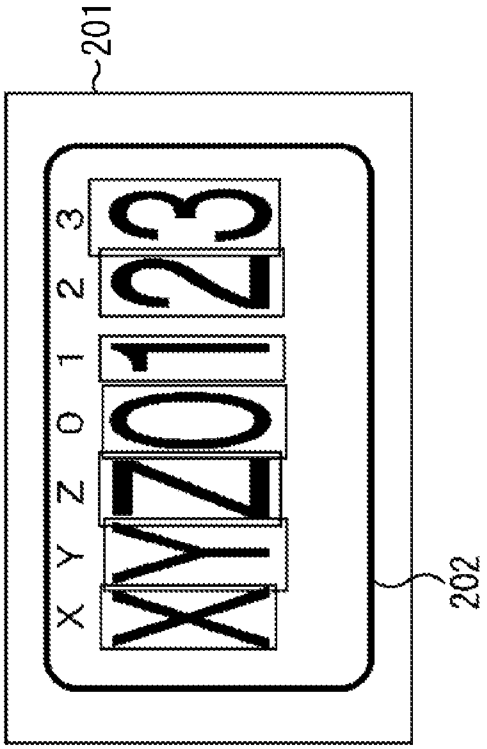
Figure 10D:
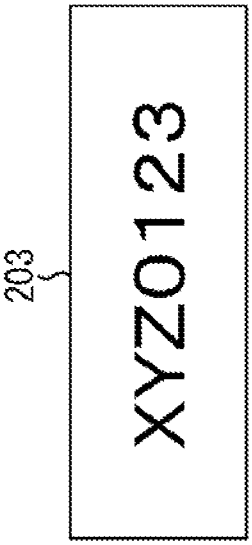

For example, the entry and leaving management unit 132 specifies a partial area 201 including a license plate of an automobile with respect to a captured image as illustrated in FIG. 10A. In a case where the detection is successful (in a case where the partial area 201 can be specified), the entry and leaving management unit 132 cuts out the partial area 201 including the detected license plate from the captured image (FIG. 10B). The image of the partial area 201 includes an image of a license plate 202 of the automobile. The entry and leaving management unit 132 performs character recognition of characters written on the license plate 202, as illustrated in FIG. 10C, in the image of the license plate 202 (the image of the partial area 201). In the case of FIG. 10C, the characters "X", "Y", "Z", "0", "1", "2", and "3" described on the license plate 202 are recognized. Therefore, the entry and leaving management unit 132 can recognize the vehicle registration number 203 (XYZ0123) described on the license plate 202, as illustrated in FIG. 10D.

Alternatively, the entry and leaving management unit 132 may perform an image analysis for the captured image and extract a characteristic of the vehicle included in the captured image as the vehicle information. The characteristic to be extracted may be any characteristic. For example, the characteristic may be the vehicle name, the vehicle type, the model type, the vehicle color, or the like of the vehicle. Of course, another characteristic may be extracted.

Figure 11:
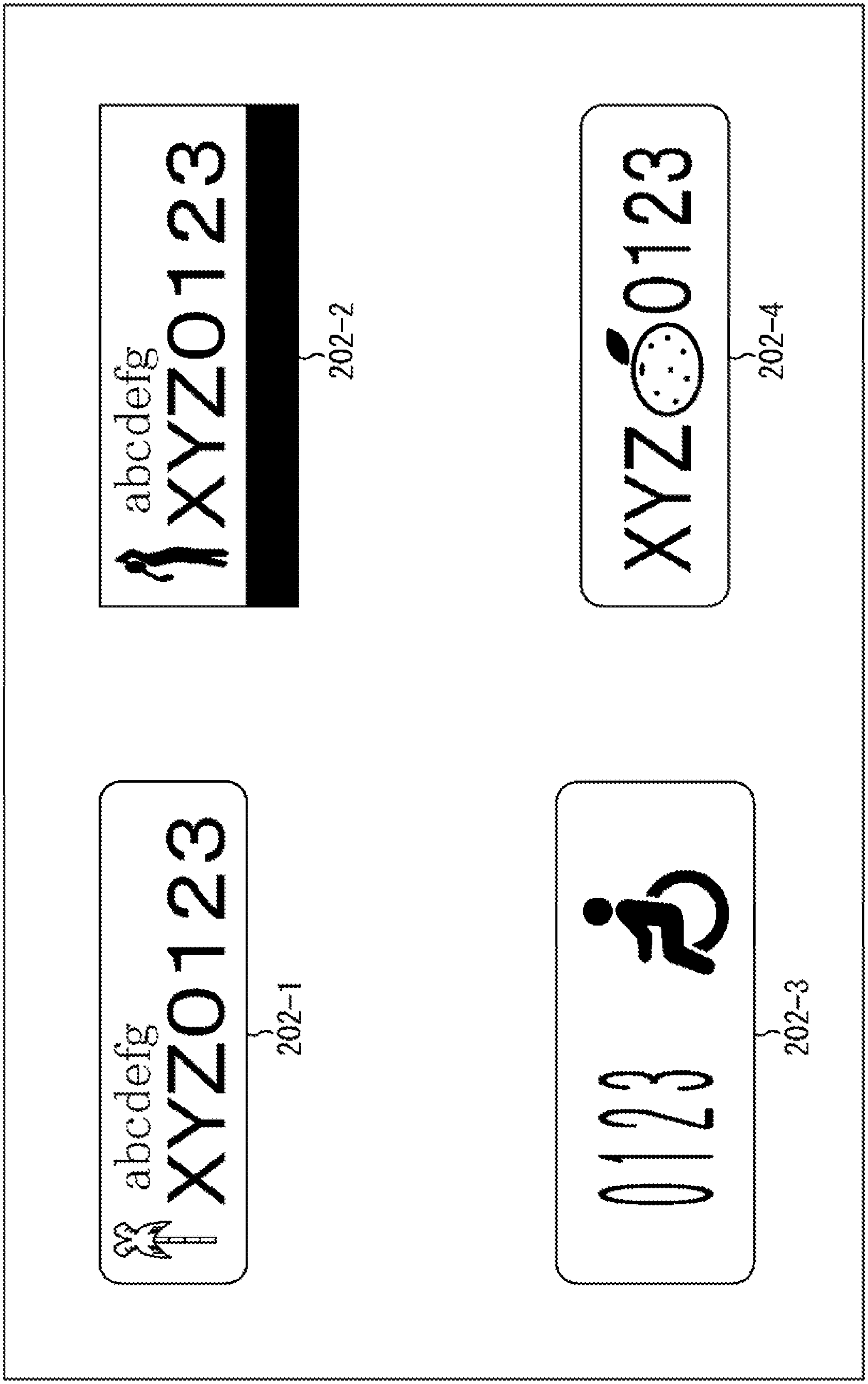
FIG. 11 is a diagram for describing an example of a license plate.

Moreover, the method for these image analyses (the detection and character recognition of the license plate, and the vehicle characteristic extraction) is arbitrary. For example, the entry and leaving management unit 132 may perform the image analyses using an evaluator generated using learning (so-called machine learning, deep learning, or the like). For example, the entry and leaving management unit 132 may generate an evaluator by inputting the captured image (entire image), the image of the license plate 202 of the automobile, information indicating a vehicle registration number 203, information indicating a characteristic of the vehicle, and the like to a predetermined calculation model (for example, a calculation model based on a multilayer neural network) as learning data and performing learning, and perform the above-described image analyses using the evaluator. For example, there are some countries where various designs are allowed as designs of the license plate (and characters described on the license plate) such as license plates 202-1 to 202-4 illustrated in FIG. 11. In such a case, by performing the image analyses using the above-described learning result, the entry and leaving management unit 132 can more accurately perform the image analyses (the detection of the license plate, the character recognition, the vehicle characteristic extraction, and the like) than processing based on simple image characteristic extraction.

Furthermore, even in a case where automatic license plate recognition (ALPR) is difficult at night or in a case where the vehicle number sign is dirty, highly accurate recognition results can be obtained by performing the image analyses for the captured image using recognition artificial intelligence (AI) for the vehicle registration number, and occurrence of a problem that appropriate control is not performed although a reserved car has arrived due to erroneous recognition or unrecognition can be avoided, for example.

Note that the image analyses may be performed outside the edge analytics IoT camera 101 (by another device). For example, the captured image may be transmitted to an analysis device (not illustrated) connected by wired communication or wireless communication with the edge analytics IoT camera 101, and the analysis device may analyze the captured image and return vehicle information (for example, text data of the vehicle registration number or the like) detected from the captured image to the edge analytics IoT camera 101 as an analysis result. Returning to FIG. 9, in step S193, the entry and leaving management unit 132 determines whether or not the vehicle information has been detected. In a case where it is determined that the vehicle information has not been detected, the processing returns to step S191 and the processing in step S191 and subsequent steps is repeated. Furthermore, in step S193, in a case where it is determined that the vehicle information has been detected, the processing proceeds to step S194.

In step S194, the entry and leaving management unit 132 inquires of the reservation information database 123 the reservation information on the basis of the detected vehicle information. For example, the entry and leaving management unit 132 determines whether or not the vehicle registration number included in each reservation information matches the vehicle registration number detected from the captured image In a case where there is the reservation information corresponding to the detection information, the entry and leaving management unit 132 reads the reservation information from the reservation information database 123.

In step S195, the entry and leaving management unit 132 determines whether or not the vehicle appearing in the captured image is the reserved vehicle on the basis of the inquiry result. In a case where there is the reservation information corresponding to the vehicle information detected from the captured image, and the reservation information is read from the reservation information database 123, the entry and leaving management unit 132 determines that the vehicle appearing in the captured image is the reserved vehicle, and advances the processing to step S196.

In step S196, the entry and leaving management unit 132 supplies the control information for opening the gate to the gate device 102 via the communication unit 121. The control information is acquired by the gate processing unit 142 of the gate device 102 in step S141 in FIG. 8. In step S142, the gate processing unit 142 controls the gate drive unit 143 on the basis of the control information to open the gate. That is, the entry and leaving management unit 132 causes the gate device 102 to open the gate and allows the reserved vehicle to enter the parking lot. At that time, if necessary, the gate device 102 may output a guidance to a parking place or the like.

In step S197, the entry and leaving management unit 132 updates the reservation information and sets a "state" parameter, which has been set to "before use", to "in use". This "state" parameter (in use) indicates that the reserved vehicle is in the parking lot (parked). Note that, in a case where the "state" parameter is "before use", the "state" parameter indicates that the reserved vehicle is in a state before entering (about to enter) the parking lot.

When the processing in step S197 is completed, the processing proceeds to step S198. Furthermore, in step S195, in a case where it is determined that the vehicle appearing in the captured image is not the reserved vehicle (or no vehicle appears in the captured image), the processing proceeds to step S198.

In step S198, the entry and leaving management unit 132 determines whether or not to terminate the entry management processing. In a case where it is determined not to terminate the entry management processing, the processing returns to step S191 and the processing in step S191 and subsequent steps is repeated. Furthermore, in step S198, in a case where it is determined to terminate the entry management processing, the entry management processing is terminated.

<Flow of Leaving Management Processing>

Figure 12:
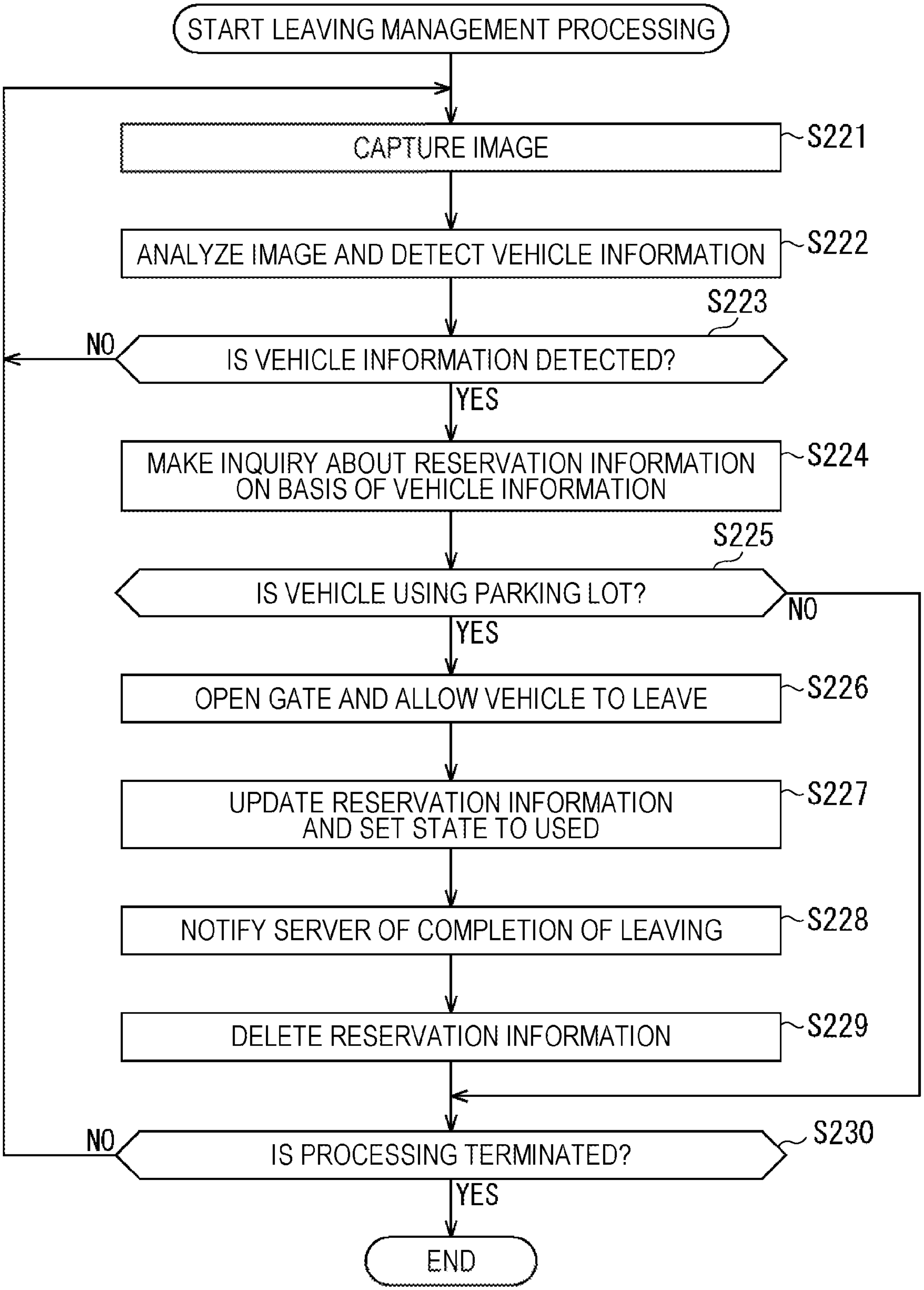
FIG. 12 is a flowchart for describing an example of a flow of leaving management processing.

Next, an example of a flow of the leaving management processing, for example, executed in step S152 in FIG. 8 will be described with reference to the flowchart in FIG. 12.

When the leaving management processing is started, processing in steps S221 to S224 is similarly executed to the processing in steps S191 to S194 (FIG. 9) of the entry management processing. Note that the imaging unit 124 captures an image at an angle of view at which the vehicle located on an opposite side of the parking lot with respect to the gate of the gate device 102 (that is, the vehicle located outside the parking lot) is captured in the case of the entry management processing (step S191), and captures an image at an angle of view at which the vehicle located on the parking lot side with respect to the gate device 102 (that is, the vehicle located inside the parking lot) is captured in the case of the leaving management processing (step S221). The imaging unit 124 may capture such images, using a plurality of imaging units 124 or a plurality of edge analytics IoT cameras 101, or using one imaging unit 124.

In step S225, the entry and leaving management unit 132 determines, on the basis of an inquiry result of the reservation information based on the vehicle information detected from the captured image, whether or not the vehicle appearing in the captured image is the vehicle (reserved vehicle) that is using the parking lot on the basis of the reservation. In a case where there is the reservation information corresponding to the vehicle information detected from the captured image, and the reservation information is read from the reservation information database 123, the entry and leaving management unit 132 determines that the vehicle appearing in the captured image is the vehicle that is using the parking lot, and advances the processing to step S226.

In step S226, the entry and leaving management unit 132 causes the gate device 102 to open the gate via the communication unit 121, and allows the vehicle to leave the parking lot, similarly to the case of step S196 (FIG. 9) of the entry management processing.

In step S227, the entry and leaving management unit 132 updates the reservation information and sets the "state" parameter, which has been set to "in use", to "used". The "state" parameter (used) indicates completion of leaving of the vehicle.

In step S228, the entry and leaving management unit 132 supplies the reservation use information to the server 103 via the communication unit 121 to notify the server 103 of completion of leaving (the use of the parking lot has been terminated).

In step S229, the reservation information management unit 131 deletes the reservation information registered in the reservation information database 123.

When the processing in step S229 is completed, the processing proceeds to step S230. Furthermore, in step S225, in a case where it is determined that the vehicle appearing in the captured image is not the vehicle in use (or no vehicle appears in the captured image), the processing proceeds to step S230.

In step S230, the entry and leaving management unit 132 determines whether or not to terminate the leaving management processing. In a case where it is determined not to terminate the leaving management processing, the processing returns to step S221 and the processing in step S221 and subsequent steps is repeated. Furthermore, in step S230, in a case where it is determined to terminate the leaving management processing, the leaving management processing is terminated.

By executing each processing as described above, the parking lot reservation management can be performed. Therefore, complicated work by a parking lot manager becomes unnecessary, and an increase in cost can be suppressed. Furthermore, an increase in load on the parking lot manager can be suppressed.

2. Second Embodiment

<Entry and Leaving Management Based on Time Information>

When the entry and leaving management unit 132 of the edge analytics IoT camera 101 determines whether or not the vehicle is the reserved vehicle in order to control opening and closing of the gate in the entry management processing (step S195), the reservation information has been inquired on the basis of the vehicle information in the first embodiment. Moreover, opening and closing of the gate may be controlled using time information. For example, an entry and leaving management unit 132 may determine whether or not a current time is an entry available time corresponding to reservation information, and in a case where it is determined that the current time is the entry available time, a gate device 102 is caused to open a gate. That is, the entry and leaving management unit 132 may not allow a vehicle to enter a parking lot if the time is not the entry available time even if the vehicle is a reserved vehicle.

The entry available time is arbitrary and may be predetermined, for example. For example, the entry available time may be set to a time within a reservation time that is a time to park a vehicle secured by reservation or a time within a predetermined time before a start time of the reservation time. For example, the start time of the reservation time is time T1 when the reservation time is from time T1 to time T2. In this case, assuming that the predetermined time is 5 minutes, the entry available time is a time from 5 minutes before time T1 to time T2. That is, in a case where the reserved vehicle comes in front of the gate device 102 within the time, the entry and leaving management unit 132 permits the entry and opens the gate.

Figure 13:
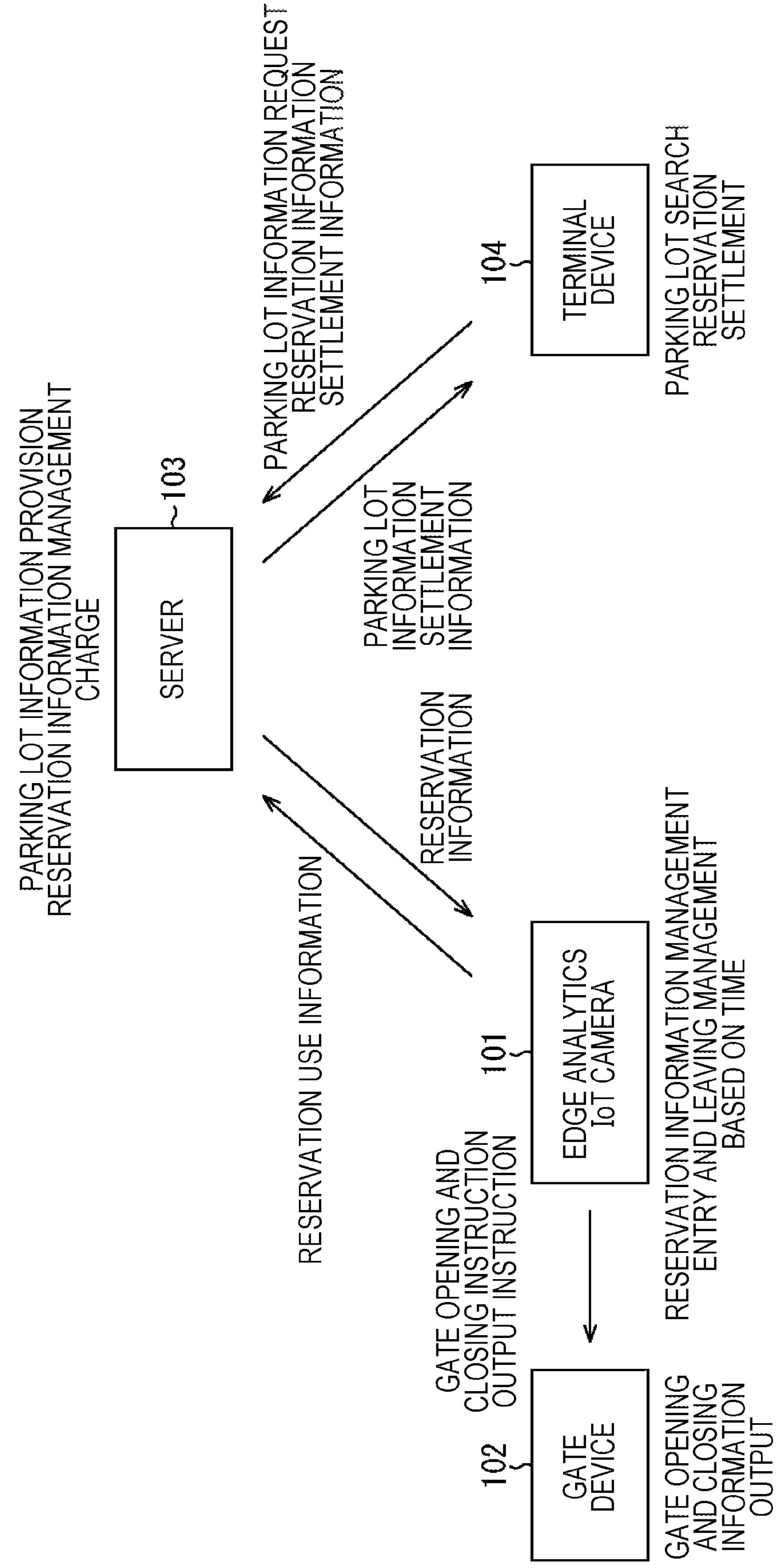
FIG. 13 is a diagram for describing processing performed by each device and examples of information exchanged between the devices.

That is, in this case, for example, an edge analytics IoT camera 101 performs entry management based on time, as illustrated in FIG. 13.

Of course, the predetermined time is arbitrary and is not limited to the above example. Furthermore, the determination criterion of the reservation time information may be appropriately changed according to the availability of the parking lot. For example, in a case where the parking lot is vacant or the number of reservations is small, the length of the “predetermined time” may be increased.

Furthermore, even if the time is not the entry available time (for example, one hour before the reservation time, or the like), if there is a vacancy in the parking lot, the parking may be permitted and the gate may be opened. That is, in a case where it is determined that the current time is an entry unavailable time, the entry and leaving management unit 132 confirms the use status of the parking lot and opens the gate in a case where the parking lot is available.

<Edge Analytics IoT Camera>

Figure 14:
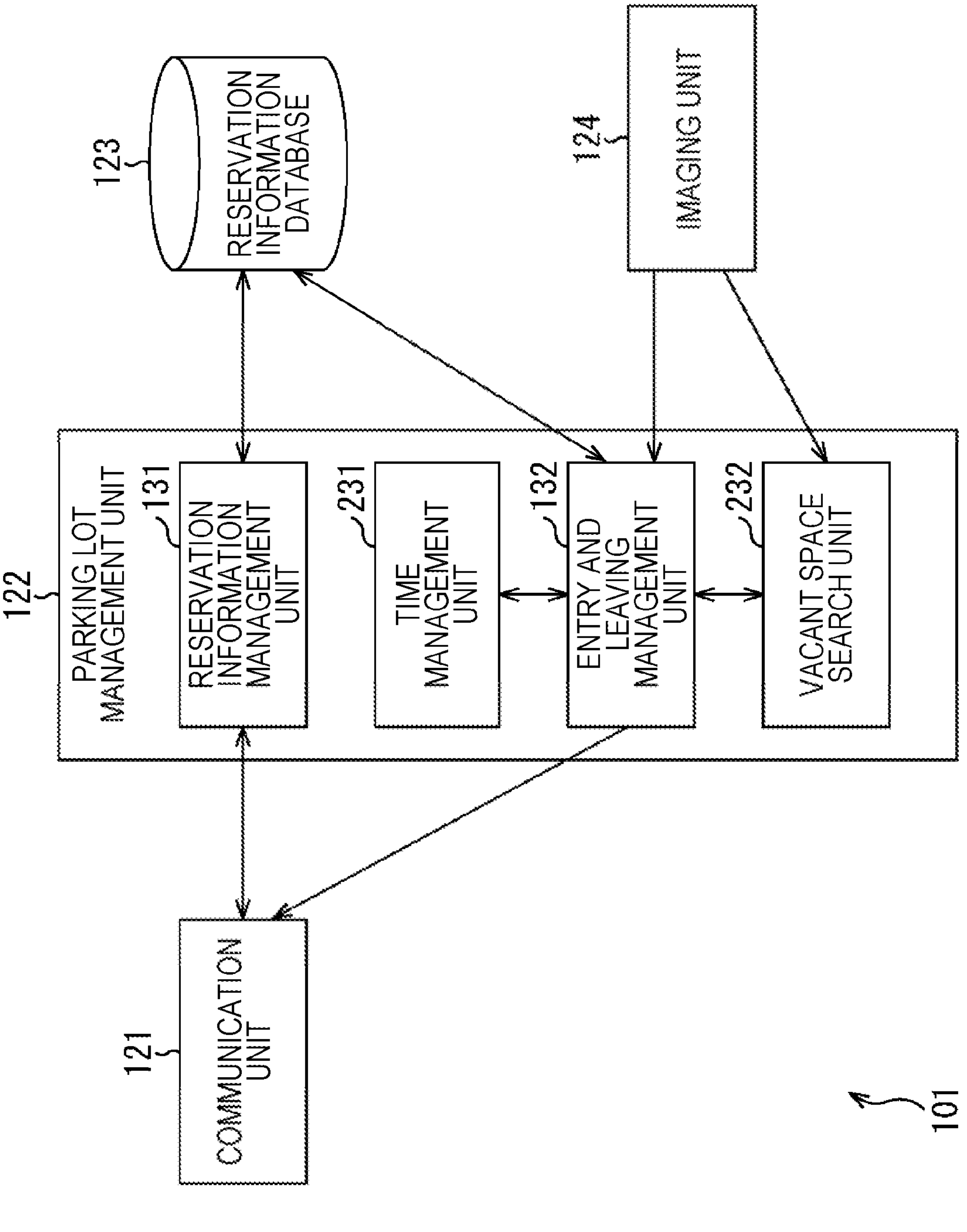
FIG. 14 is a block diagram illustrating a main configuration example of an edge analytics IoT camera.

FIG. 14 is a block diagram illustrating a main configuration example of an edge analytics IoT camera 101 in this case. As illustrated in FIG. 14, the parking lot management unit 122 of the edge analytics IoT camera 101 in this case includes a time management unit 231 and a vacant space search unit 232, in addition to the configuration of the first embodiment (FIG. 3).

The time management unit 231 performs processing regarding time. For example, the time management unit 231 determines whether or not the current time is the entry available time and returns a determination result to the entry and leaving management unit 132.

The vacant space search unit 232 performs processing regarding a searching for a vacant space. For example, the vacant space search unit 232 causes an imaging unit 124 to capture an image of a parking available position of the parking lot, and analyzes the captured image, whereby determining whether or not there is a vacant space, that is, parking is available. The vacant space search unit 232 returns a determination result to the entry and leaving management unit 132. Note that the determination of a vacant space may be performed on the basis of reservation information.

<Flow of Entry Management Processing>

Figure 15:
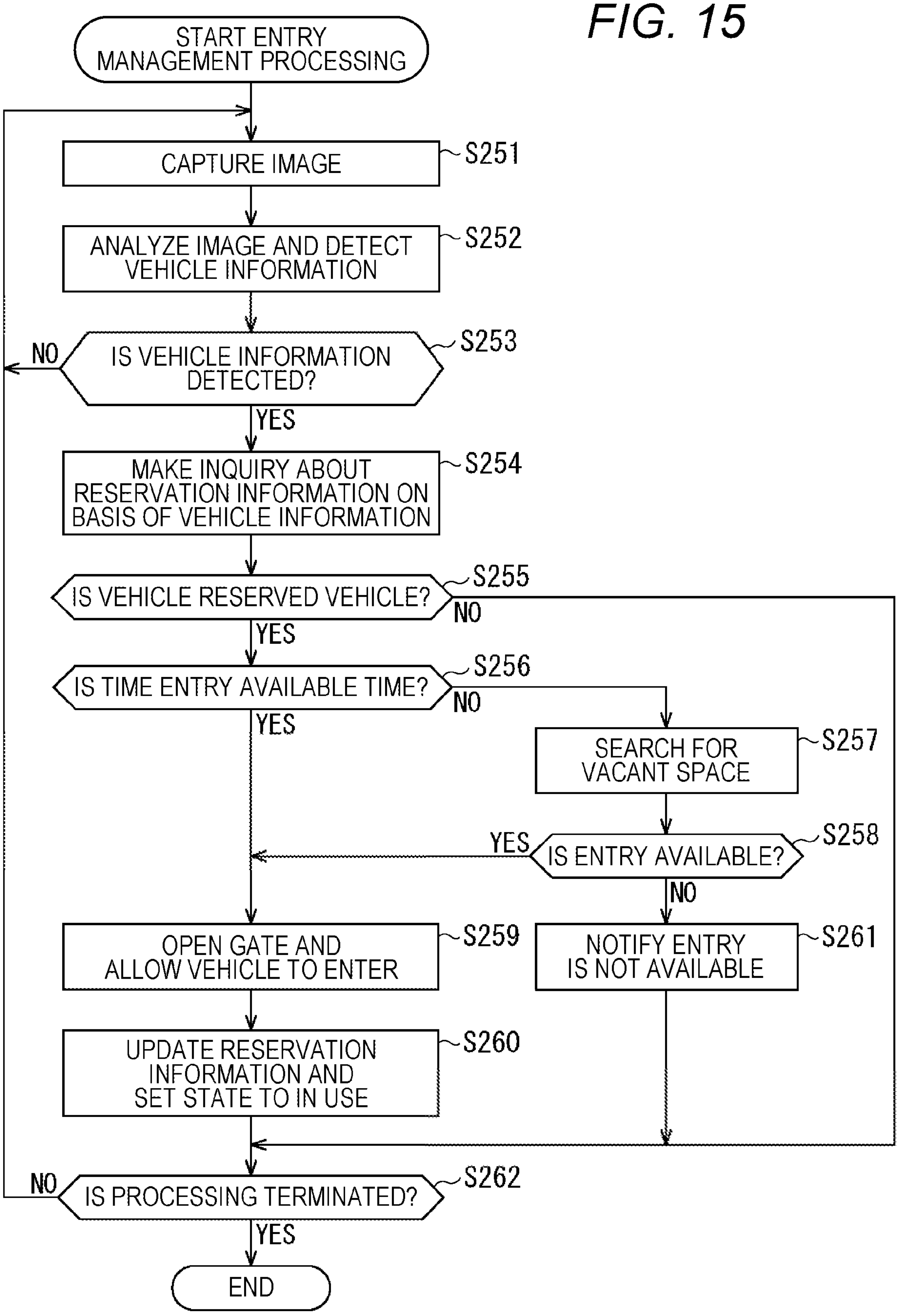
FIG. 15 is a flowchart for describing an example of a flow of entry management processing.

An example of a flow of entry management processing in that case will be described with reference to the flowchart in FIG. 15. When the entry management processing is started, processing in steps S251 to S255 is similarly executed to the processing in steps S191 to S195 (FIG. 9).

In step S255, in a case where it is determined that the vehicle appearing in the captured image is the reserved vehicle, the processing proceeds to step S256.

In step S256, the time management unit 231 determines whether or not the current time is the entry available time. In a case where it is determined that the current time is not the entry available time by reference to (or deriving) the entry available time set as described above, the processing proceeds to step S257.

In step S257, the vacant space search unit 232 searches for a vacant space of the parking lot by causing the imaging unit 124 to capture the parking lot and analyzing the captured image. Then, in step S258, the entry and leaving management unit 132 determines whether or not the reserved vehicle can enter the parking lot on the basis of a search result (that is, the reserved vehicle that has entered the parking lot can be parked) In a case where it is determined that the current time is the entry available time, the processing proceeds to step S259. Furthermore, in step S256, in a case where it is determined that the current time is the entry available time, the processing proceeds to step S259.

Figure 9:
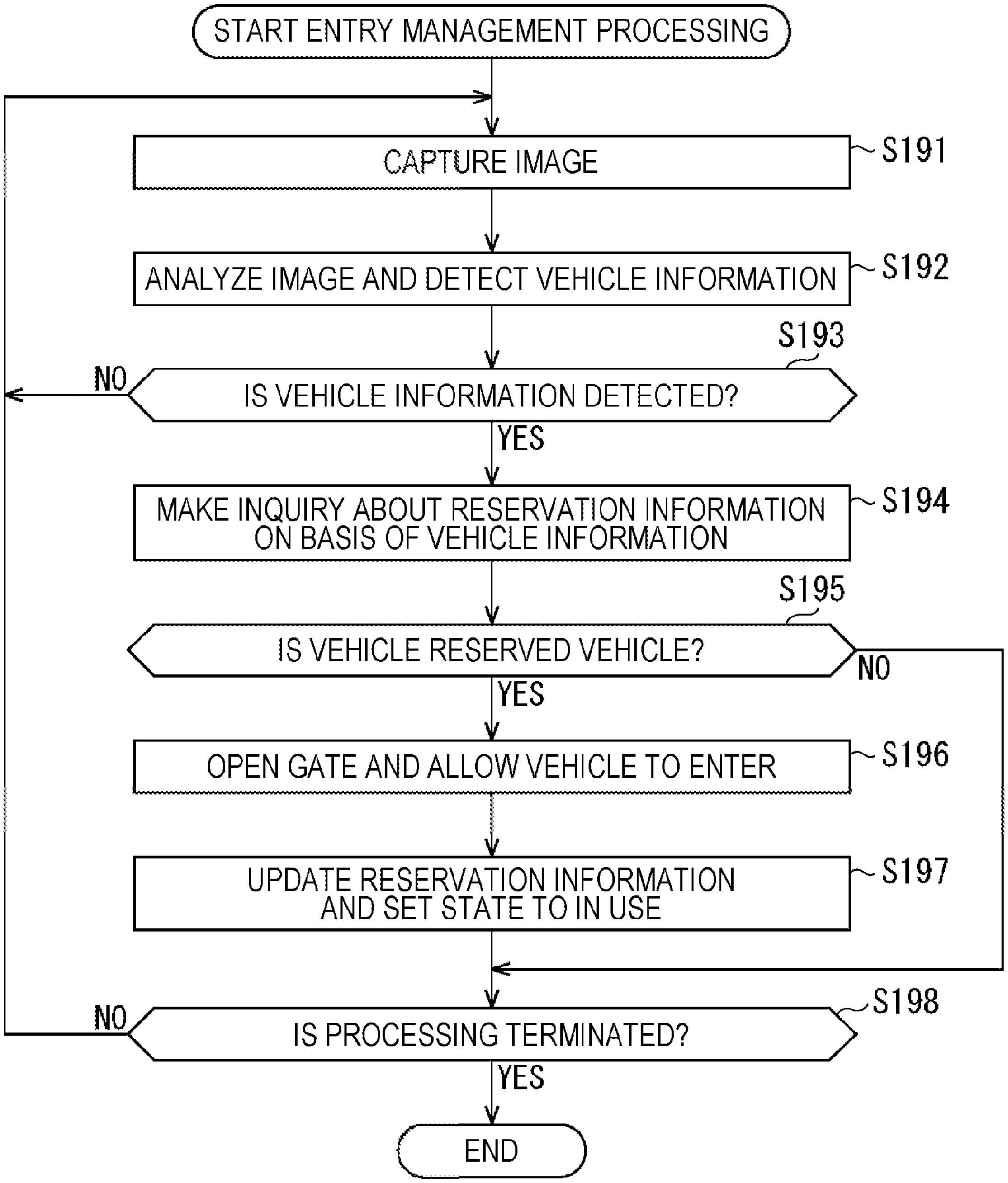
FIG. 9 is a flowchart for describing an example of a flow of entry management processing.

Processing in steps S259 and S260 is executed similarly to the processing in steps S196 and S197 (FIG. 9). When the processing in step S260 is completed, the processing proceeds to step S262.

Furthermore, in step S258, in a case where it is determined that entry is not available (the reserved vehicle that has entered the parking lot is not able to be parked), the processing proceeds to step S261. In step S261, the entry and leaving management unit 132 controls the gate device 102 via a communication unit 121 to notify that the entry is not available using an output unit 144. A gate processing unit 142 of the gate device 102 performs the notification using images and sounds using the output unit 144 according to the control. A user (driver or the like) of the vehicle can grasp that the entry is not available from the notification. Note that a notification as to when a parking space will be available may be made. When the processing in step S261 is completed, the processing proceeds to step S262. Moreover, in step S255, in a case where it is determined that the vehicle is not the reserved vehicle, the processing proceeds to step S262.

Processing in step S262 is executed similarly to step S198 (FIG. 9). In step S262, in a case where it is determined to terminate the entry management processing, the entry management processing is terminated.

By executing the entry management processing as described above, the edge analytics IoT camera 101 can control the entry of a vehicle on the basis of the time information. By the control, the entry and leaving management according to a reservation status can be further performed.

3. Third Embodiment

<Provision of Parking Lot Information>

In the above, the description has been made such that the parking lot information is registered in advance in the parking lot information database 153 of the server 103. However, an embodiment is not limited thereto, and parking lot information may be able to be registered or updated as appropriate.

Figure 16:
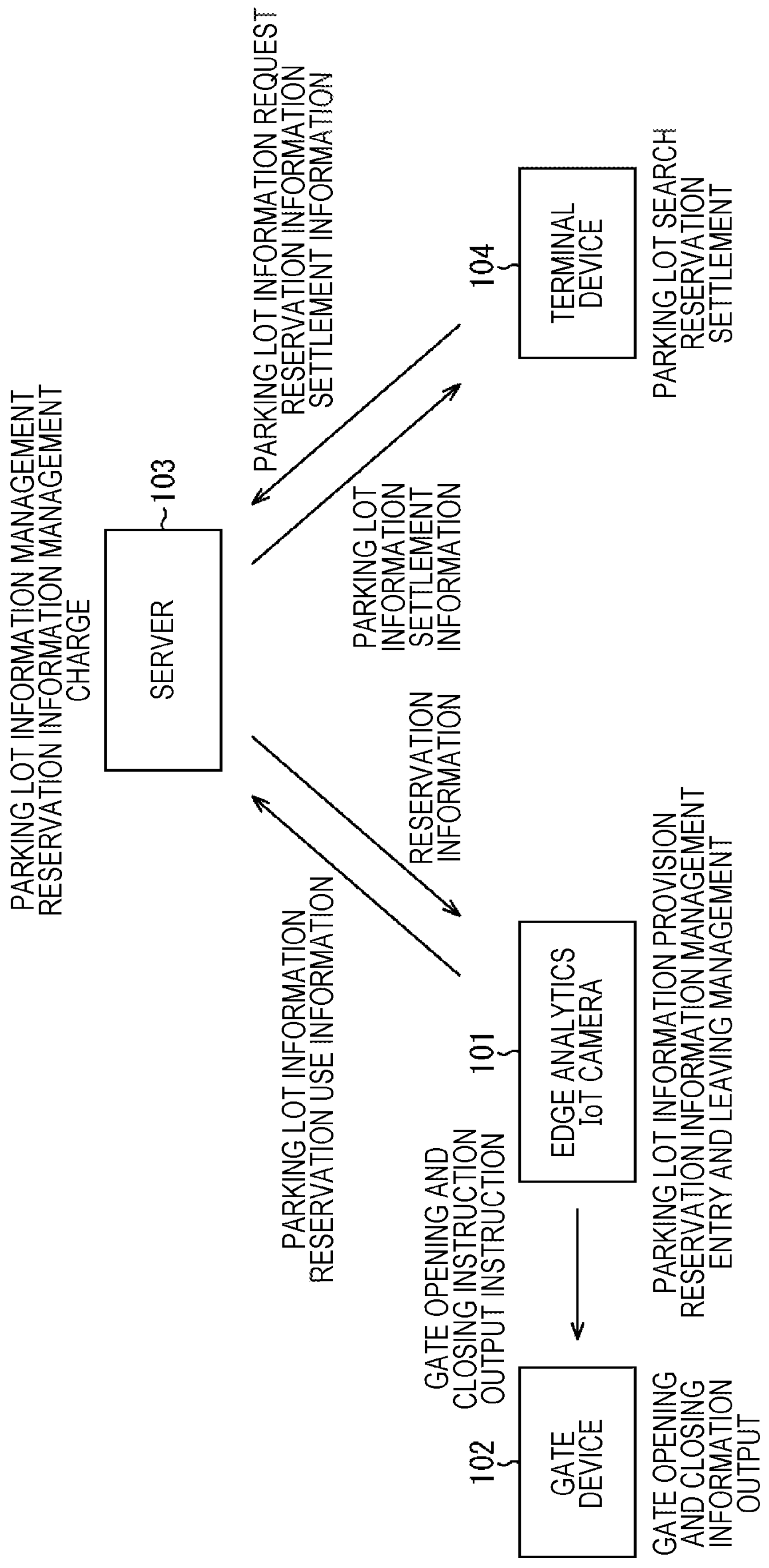
FIG. 16 is a diagram for describing processing performed by each device and examples of information exchanged between the devices.

For example, as illustrated in FIG. 16, an edge analytics IoT camera 101 may provide a server 103 with information regarding a parking lot where the edge analytics IoT camera 101 itself is installed (parking lot information). For example, some parking lots are available or unavailable depending on the day of the week and time.

For example, on a university campus, some are used as parking lots exclusively for those involved in the university on weekdays, and some are open to the public and used as parking lots on holidays. Furthermore, the number of parkable vehicles may be different between, for example, weekdays and holidays, or may be different between daytime and nighttime.

That is, as described above, in a case where whether or not there is a parking lot, the performance as a parking lot, or the like varies according to time information, such information needs to be provided to the server 103. Therefore, the edge analytics IoT camera 101 may provide the server 103 with the parking lot information. The server 103 may acquire the parking lot information and register the parking lot information in a parking lot information database 153 or update registered parking lot information using the acquired parking lot information.

<Edge Analytics IoT Camera>

Figure 17:
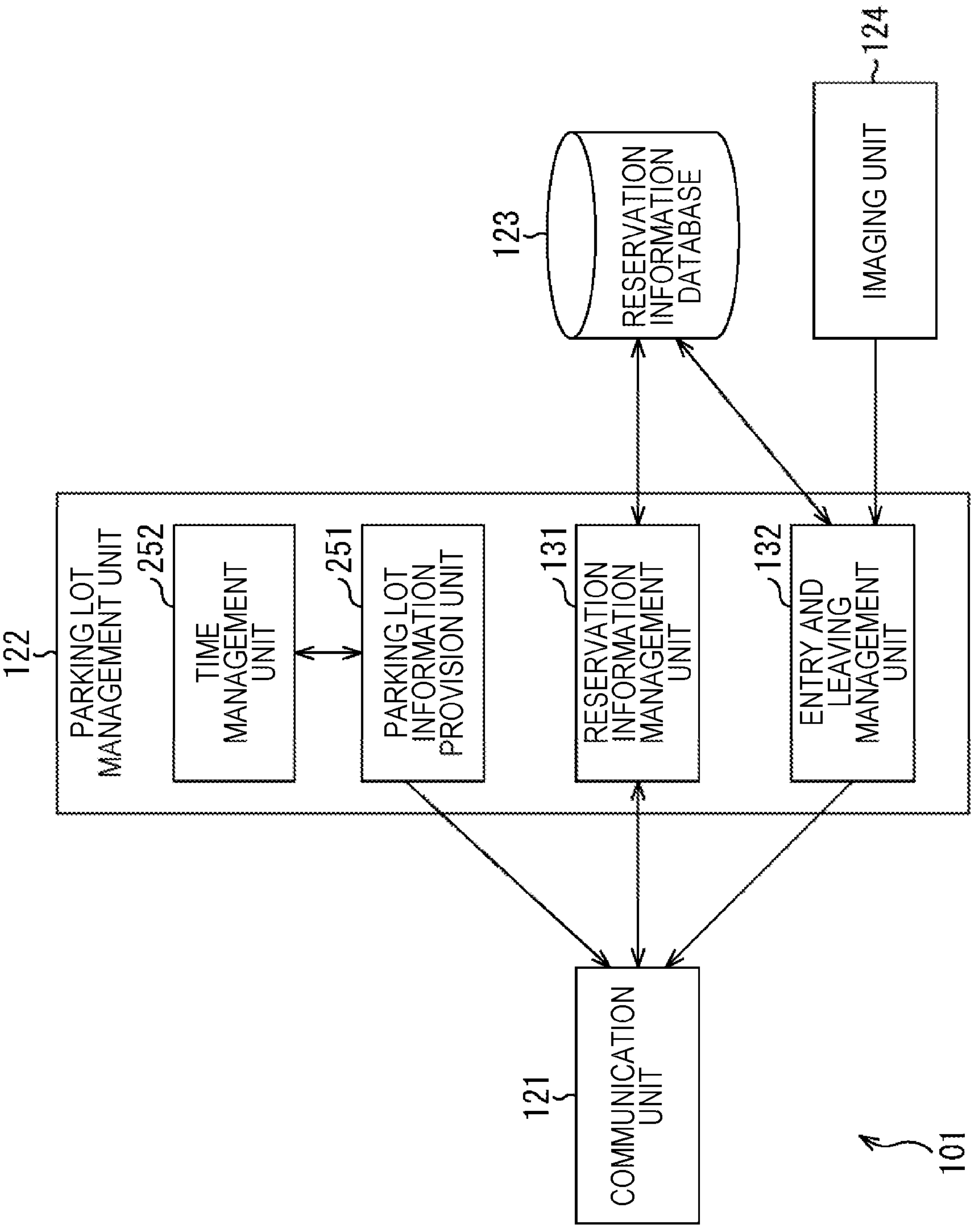
FIG. 17 is a block diagram illustrating a main configuration example of an edge analytics IoT camera.

A main configuration example of the edge analytics IoT camera 101 in this case is illustrated in FIG. 17. As illustrated in FIG. 17, the parking lot management unit 122 of the edge analytics IoT camera 101 in this case includes a parking lot information provision unit 251 and a time management unit 252, in addition to the configuration of the first embodiment (FIG. 3).

The parking lot information provision unit 251 generates parking lot information necessary for a reservation, and provides the parking lot information to the server 103 via a communication unit 121.

The time management unit 252 performs processing regarding time. For example, the time management unit 252 generates parking lot information according to date and time and supplies the parking lot information to the parking lot information provision unit 251. The parking lot information provision unit 251 provides the parking lot information according to date and time to the server 103 via the communication unit 121.

<Server>

Figure 18:
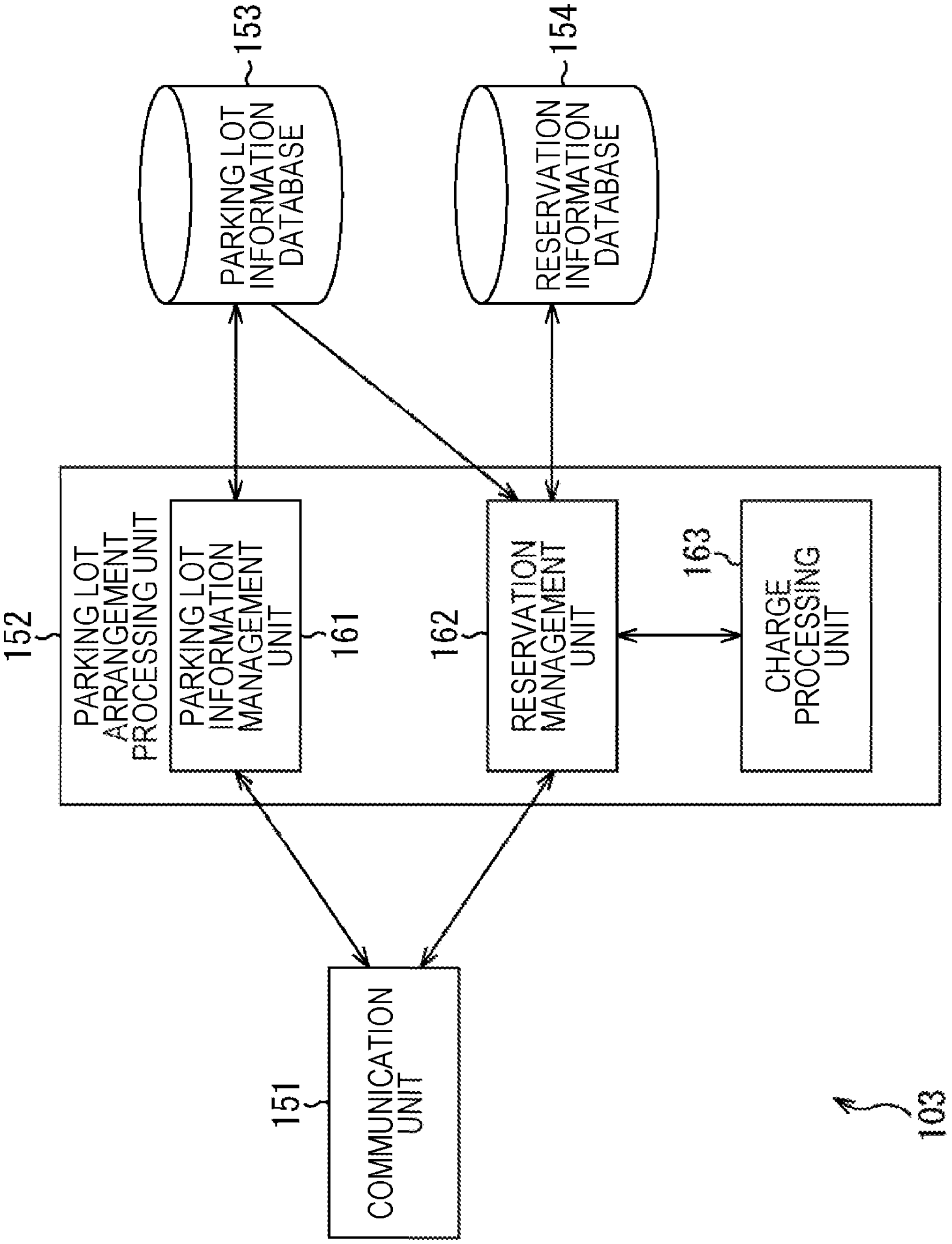
FIG. 18 is a block diagram illustrating a main configuration example of a server.

FIG. 18 is a block diagram illustrating a main configuration example of the server 103. The configuration of a processing unit is similar to that in the example in FIG. 5. In this case, a parking lot information management unit 161 acquires the parking lot information supplied from the edge analytics IoT camera 101 and registers and manages the parking lot information in the parking lot information database 153.

<Flow of Parking Lot Information Provision Processing>

Figure 19:
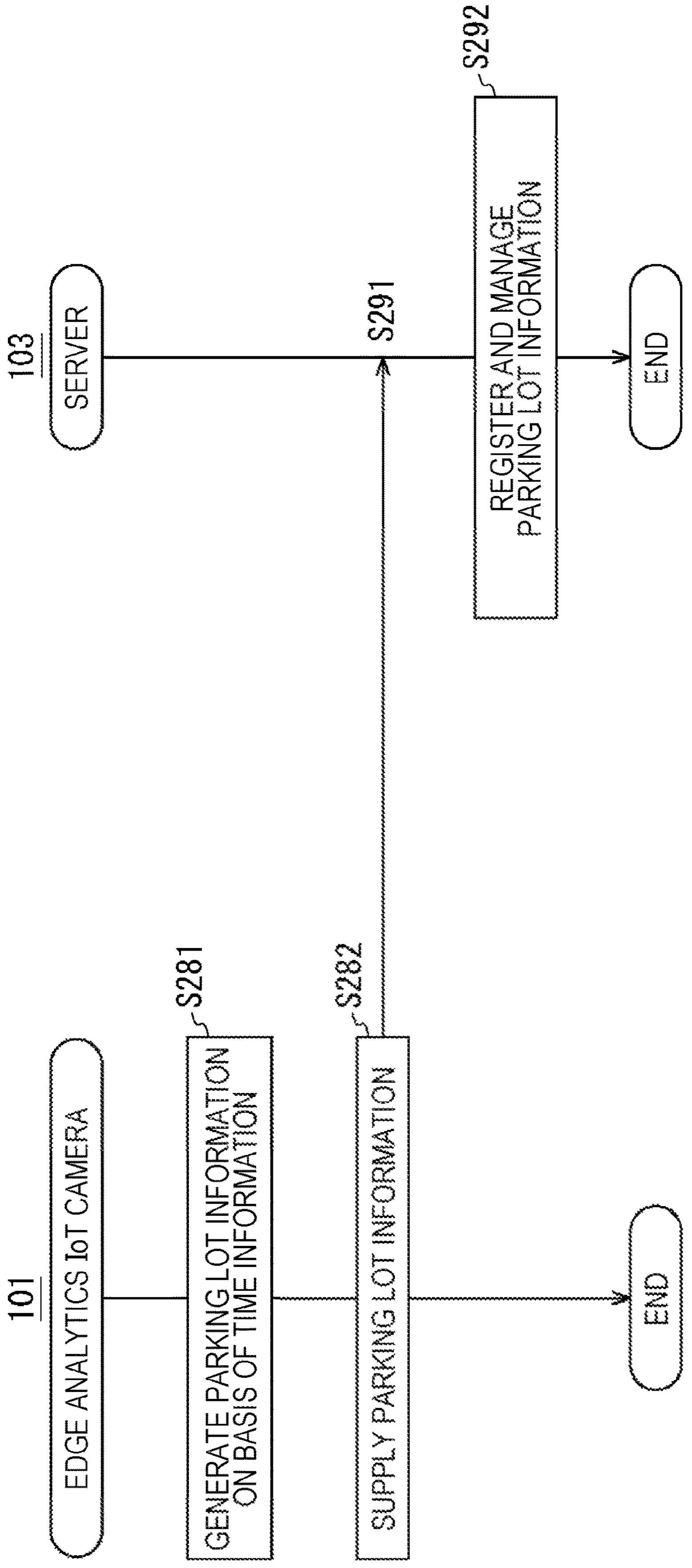
FIG. 19 is a flowchart for describing an example of a flow of parking lot information provision processing.

In this case, the edge analytics IoT camera 101 and the server 103 exchange the parking lot information by executing parking lot information provision processing. An example of a flow of the parking lot information provision processing will be described with reference to the flowchart in FIG. 19.

When the parking lot information provision processing is started, the time management unit 252 of the edge analytics IoT camera 101 generates parking lot information on the basis of the time information in step S281.

In step S282, the parking lot information provision unit 251 supplies the parking lot information to the server 103 via the communication unit 121.

In step S291, the parking lot information management unit 161 of the server 103 performs communication with the edge analytics IoT camera 101 via a communication unit 151, and acquires the parking lot information.

In step S292, the parking lot information management unit 161 registers and manages the parking lot information in the parking lot information database 153. When the processing in step S292 is terminated, the parking lot information provision processing is completed.

By executing each processing in this manner, the parking lot information can be added or updated to the parking lot information database 153. Thereby, more various parking lot reservation management can be performed.

4. Fourth Embodiment

<Management of Use Status>

Figure 20:
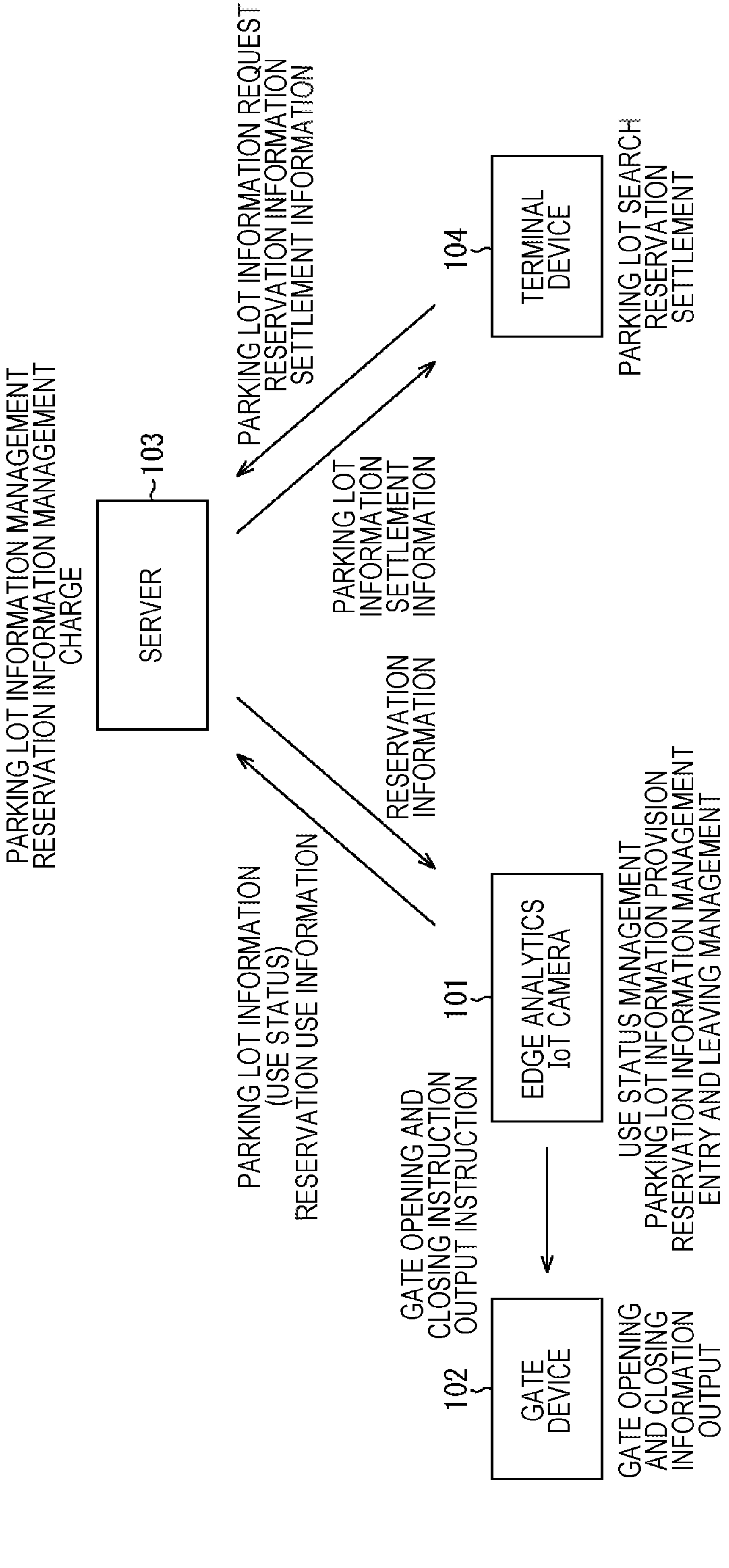
FIG. 20 is a diagram for describing processing performed by each device and examples of information exchanged between the devices.

Furthermore, for example, as illustrated in FIG. 20, an edge analytics IoT camera 101 may manage a use status (congestion degree) of a parking lot and include information regarding the use status in parking lot information and provide the parking lot information to a server 103. With the configuration, the server 103 can provide not only the parking lot information indicating an open parking lot but also the information regarding the use status (congestion degree) to a terminal device 104. Therefore, a user of the terminal device 104 (a user of a vehicle to be parked) can search for a parking lot to use on the basis of more specific information (that is, the use statuses of parking lots). Therefore, the convenience of the parking lot reservation system 100 can be improved.

<Edge Analytics IoT Camera>

Figure 21:
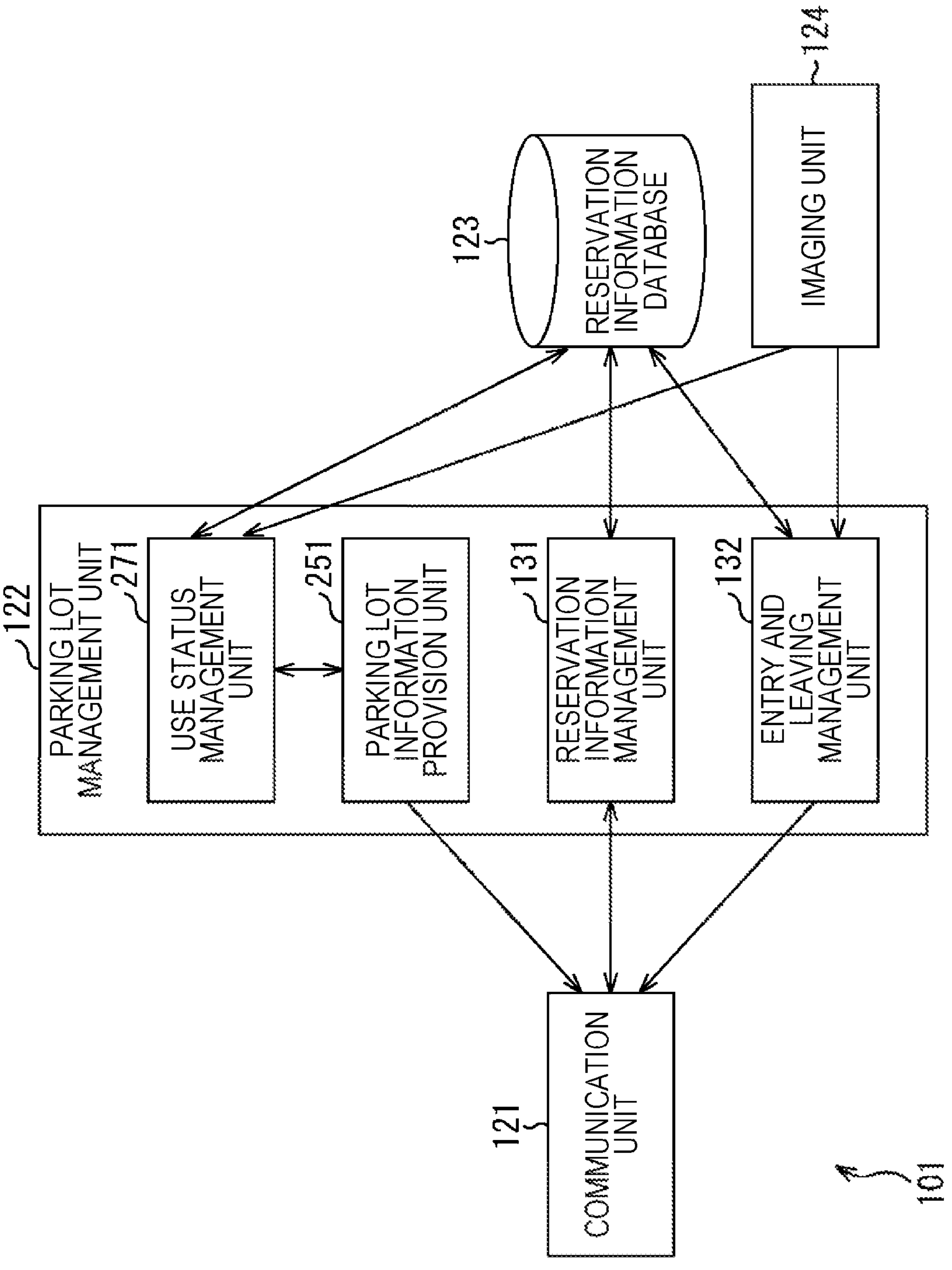
FIG. 21 is a block diagram illustrating a main configuration example of an edge analytics IoT camera.

FIG. 21 is a block diagram illustrating a main configuration example of the edge analytics IoT camera 101 in this case. As illustrated in FIG. 21, the parking lot management unit 122 of the edge analytics IoT camera 101 in this case includes a parking lot information provision unit 251 and a use status management unit 271, in addition to the configuration of the first embodiment (FIG. 3).

The parking lot information provision unit 251 generates parking lot information necessary for a reservation, and provides the parking lot information to the server 103 via a communication unit 121, similarly to the third embodiment. Furthermore, the use status management unit 271 performs processing regarding management of the use status of a parking lot. For example, the use status management unit 271 causes an imaging unit 124 to capture a parkable position of a parking lot and analyzes a captured image, thereby determining the use status and supplying a determination result to the parking lot information provision unit 251. The parking lot information provision unit 251 generates parking lot information including the determination result (information indicating the use status) and supplies the parking lot information to the server 103 via the communication unit 121.

Note that, for example, the use status management unit 271 may determine and manage the use status of the parking lot on the basis of the captured image and reservation information. For example, the use status management unit 271 may specify a vacant space from the captured image and further specify whether the vacant space is an available vacant space or an unavailable vacant space according to the reservation information of other vehicles. For example, in a case where a vacant state is confirmed from the captured image, and no reservation is present in the place at current time, the vacant space may be determined to be an available vacant space.

For example, in a case where a place is determined that no vehicle is currently parked on the basis of the captured image but the place corresponds to the reservation information that is going to have a reservation time start time within a predetermined time, the use status management unit 271 may determine that the place is not available. For example, even in the case where a vacant state is confirmed from the captured image, and no reservation is present in the place at current time, the use status management unit 271 may determine that the place is an unavailable vacant space when time to a next reservation time is shorter than predetermined time.

Furthermore, for example, in a case where a place is determined that no vehicle is currently parked on the basis of the captured image, and predetermined time or more has passed from the reservation time start time of the reservation information corresponding to the place, the place may be determined to be available. That is, when the predetermined time or more has passed from the reservation start time even in the case where there is a reservation of the corresponding place, the reservation is determined to be canceled and the place may be determined to be an available vacant space.

<Flow of Parking Lot Information Provision Processing>

An example of a flow of parking lot information provision processing in this case will be described with reference to the flowchart in FIG. 22.

When the parking lot information provision processing is started, the imaging unit 124 of the edge analytics IoT camera 101 captures an image of the parking lot in step S311, and generates a captured image.

In step S312, the use status management unit 271 determines the use status on the basis of the captured image and the reservation information.

In step S313, the parking lot information provision unit 251 generates parking lot information including the use status.

In step S314, the parking lot information provision unit 251 supplies the parking lot information to the server 103 via the communication unit 121.

In step S321, a parking lot information management unit 161 of the server 103 performs communication with the edge analytics IoT camera 101 via a communication unit 151, and acquires the parking lot information.

In step S322, the parking lot information management unit 161 registers and manages the parking lot information in the parking lot information database 153. When the processing in step S322 is terminated, the parking lot information provision processing is completed.

By executing each processing in this manner, the information regarding the use status of a parking lot can be registered in the parking lot information database 153. Thereby, more specific information (that is, the use status of the parking lot) can be provided to the user. Therefore, the convenience of the parking lot reservation system 100 can be improved.

5. Fifth Embodiment

<Setting of Use Fee>

Figure 23:
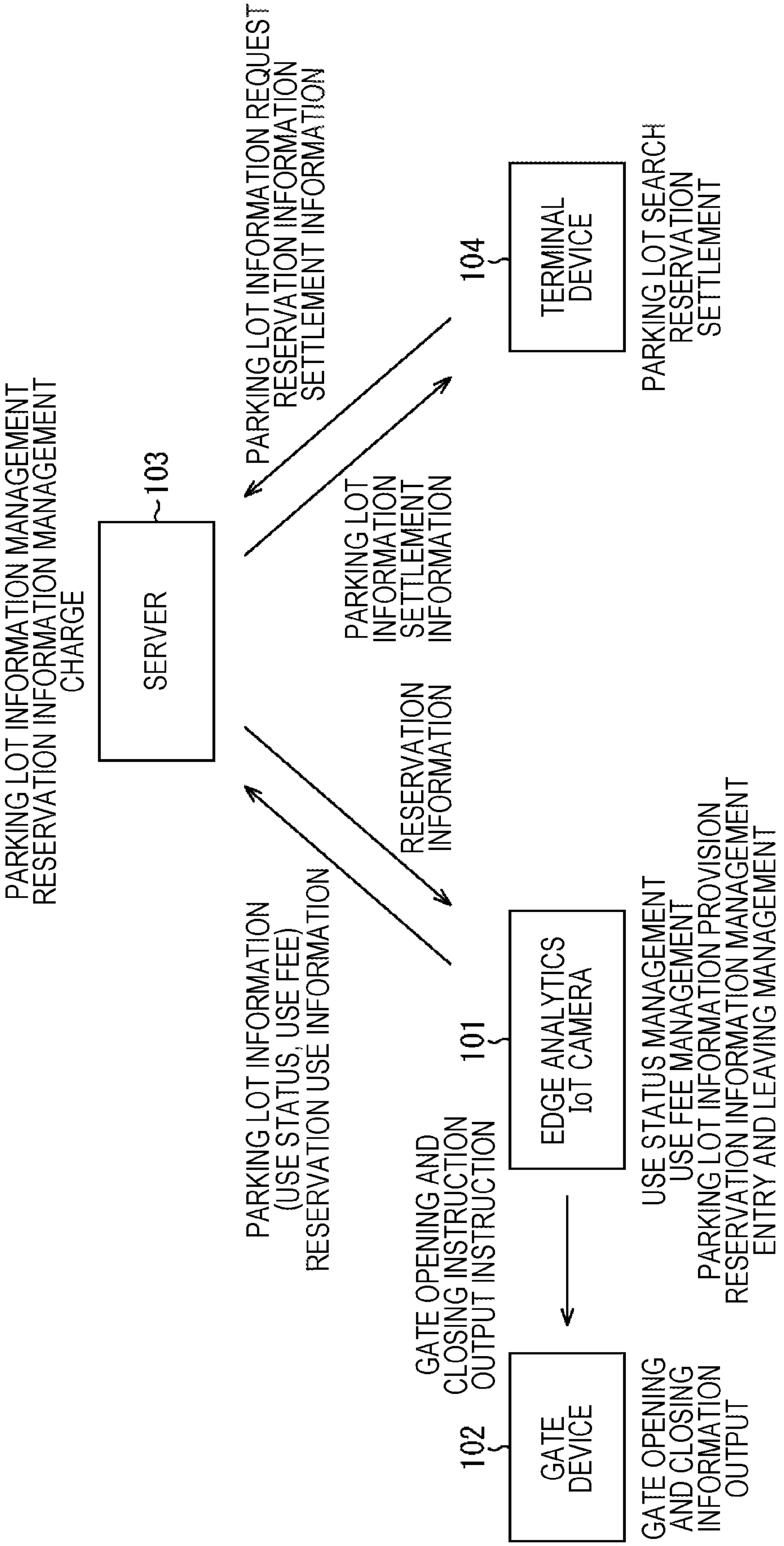
FIG. 23 is a diagram for describing processing performed by each device and examples of information exchanged between the devices.

Furthermore, for example, as illustrated in FIG. 23, an edge analytics IoT camera 101 may manage a use status (congestion degree) of a parking lot and set a use fee of the parking lot according to the use status, include information regarding the set use fee in parking lot information and provide the parking lot information to a server 103. With the configuration, price setting according to a demand can be performed.

<Edge Analytics IoT Camera>

Figure 24:
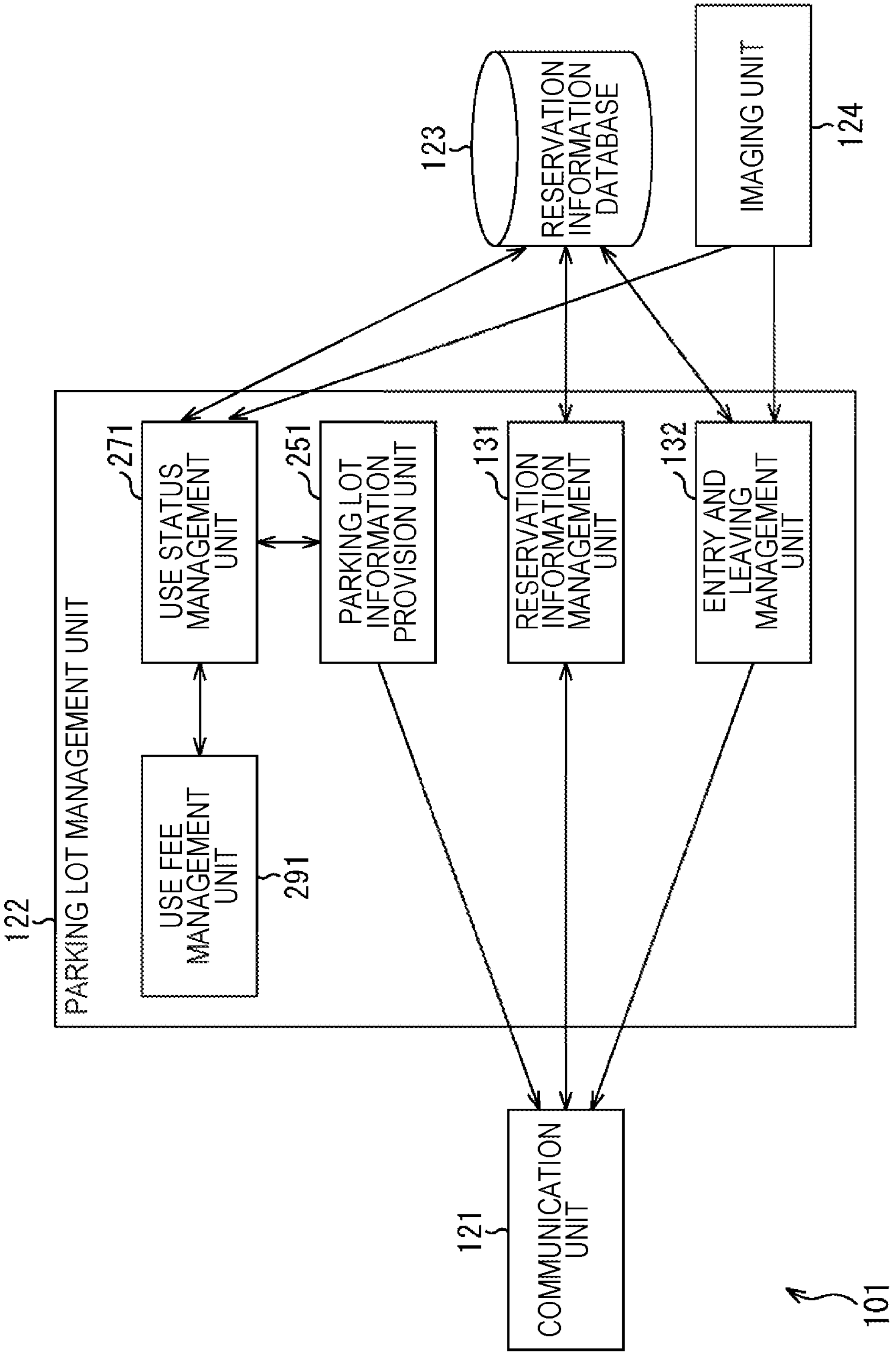
FIG. 24 is a block diagram illustrating a main configuration example of an edge analytics IoT camera.

FIG. 24 is a block diagram illustrating a main configuration example of the edge analytics IoT camera 101 in this case. As illustrated in FIG. 24, the parking lot management unit 122 of the edge analytics IoT camera 101 in this case includes a use fee management unit 291, in addition to the configuration of the fourth embodiment (FIG. 21).

The use fee management unit 291 manages a use fee of a parking lot according to a use status of the parking lot managed by a use status management unit 271. A parking lot information provision unit 251 generates parking lot information including information regarding the use fee of the parking lot managed by the use fee management unit 291, and supplies the parking lot information to the server 103 via a communication unit 121.

For example, the use fee management unit 291 may decrease the use fee (may make the use fee cheaper) as a use rate of the parking lot becomes lower (the number of vacant spaces becomes larger). Furthermore, in a case where the number of vacant spaces is equal to or larger than predetermined threshold, the use fee may be decreased (made cheaper).

Furthermore, for example, the use fee management unit 291 may increase the use fee (may make the use fee more expensive) as the use rate of the parking lot becomes higher (the number of vacant spaces becomes smaller). Furthermore, in a case where the number of vacant spaces is smaller than a predetermined threshold, the use fee may be increased (made more expensive).

<Flow of Parking Lot Information Provision Processing>

Figure 25:
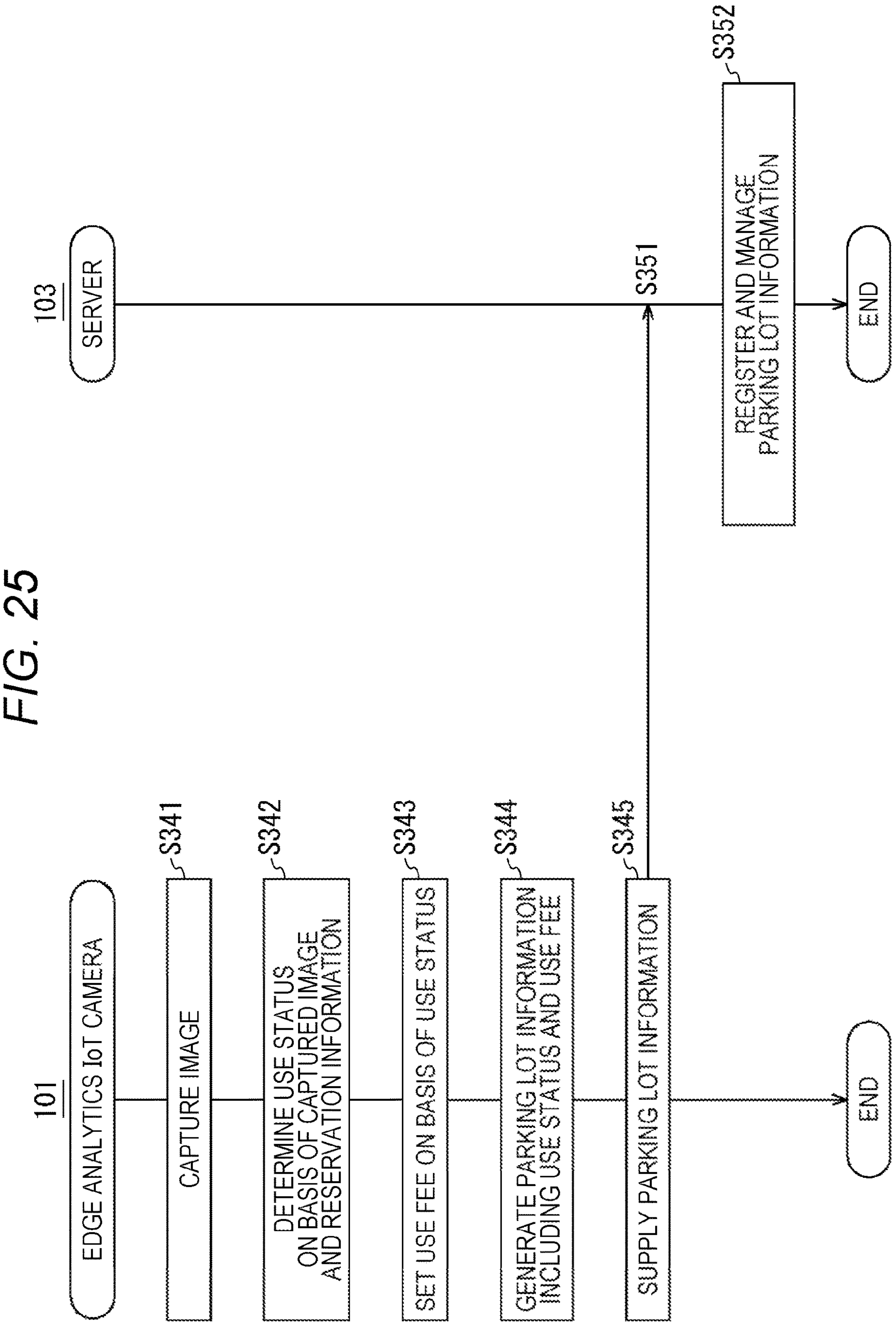
FIG. 25 is a flowchart for describing an example of a flow of parking lot information provision processing.

An example of a flow of parking lot information provision processing in this case will be described with reference to the flowchart in FIG. 25.

Figure 22:
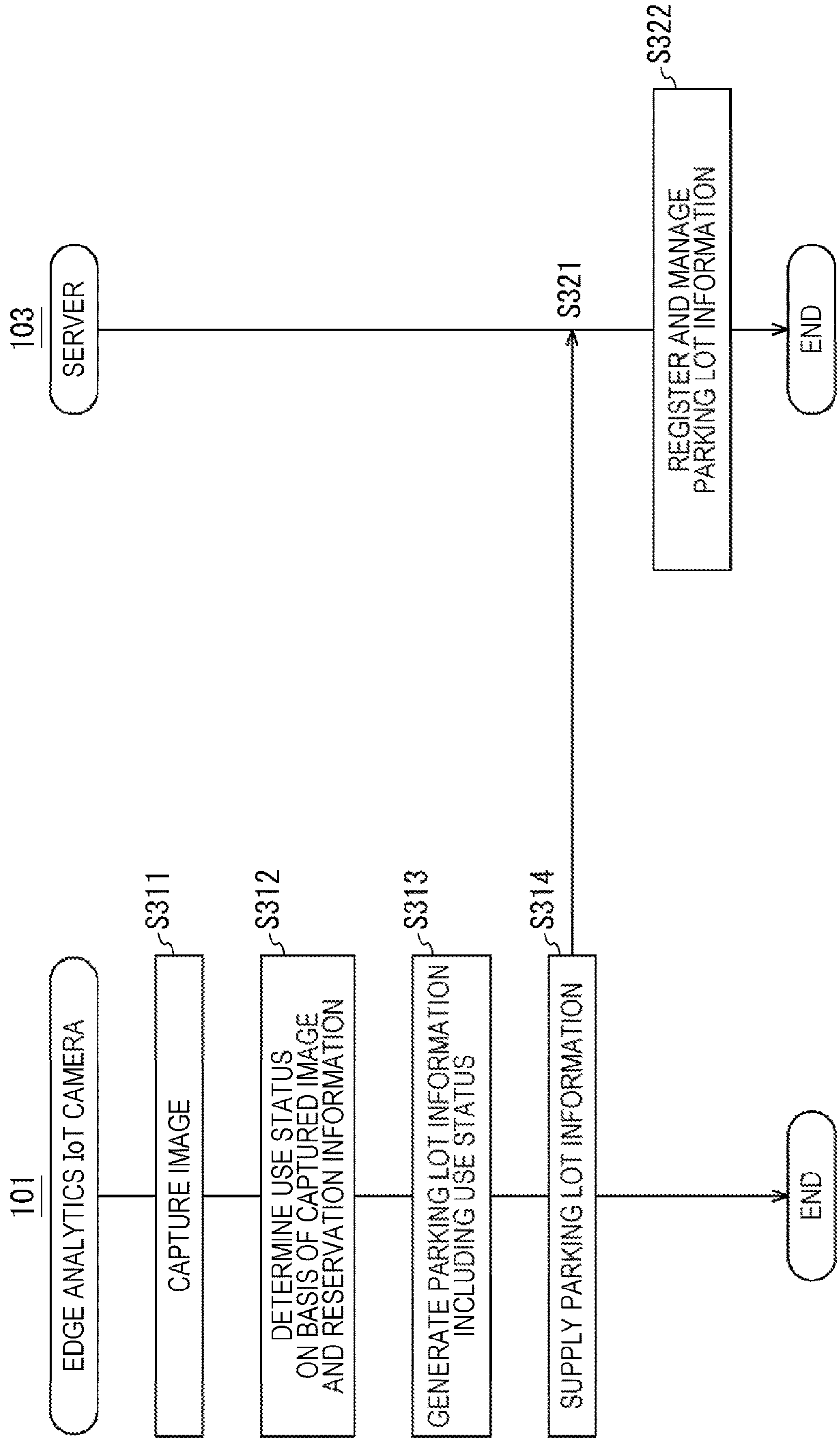
FIG. 22 is a flowchart for describing an example of a flow of parking lot information provision processing.

When the parking lot information provision processing is started, processing in steps S341 and S342 is executed similarly to the processing in steps S311 and S312 (FIG. 22).

In step S343, the use fee management unit 291 sets the use fee on the basis of the use status determined in step S342.

In step S345, the parking lot information provision unit 251 generates parking lot information including the use status determined in step S342 and the use fee set in step S343.

Processing in steps S346, S351, and S352 is executed similarly to the processing in steps S314, S321, and S322 (FIG. 22).

By executing each processing in this manner, the information regarding the use fee set on the basis of the use status of the parking lot can be registered in a parking lot information database 153. Thereby, the use fee can be made variable. Furthermore, the use fee can be set according to the use status, for example, and price setting according to a demand can be further performed. Therefore, the convenience of a parking lot reservation system 100 can be improved.

Note that the setting of the use fee (the setting of the use fee based on the use status of the parking lot, for example) may be performed by the server 103. For example, the server 103 may include the use fee management unit 291. In this case, an imaging unit 124 of the edge analytics IoT camera 101 captures a parking lot and generates a captured image, the use status management unit 271 manages the use status on the basis of the captured image, the reservation information, and the like, and the parking lot information provision unit 251 supplies parking lot information including the information regarding the use status to the server 103 via the communication unit 121. A parking lot information management unit 161 of the server 103 acquires the parking lot information via a communication unit 151, and the use fee management unit 291 sets the use fee according to information regarding the use status included in the parking lot information. The parking lot information management unit 161 includes the set use fee in the parking lot information, and registers and manages the parking lot information in the parking lot information database 153. With the configuration, a load on the edge analytics IoT camera 101 regarding the setting of the use fee can be reduced.

Furthermore, for example, the server 103 may include the use status management unit 271 and the use fee management unit 291 (FIG. 24). In that case, the imaging unit 124 of the edge analytics IoT camera 101 captures the parking lot and generates the captured image, and the parking lot information provision unit 251 supplies the parking lot information including the captured image to the server 103 via the communication unit 121. The parking lot information management unit 161 of the server 103 acquires the parking lot information via the communication unit 151, the use status management unit 271 determines the use status of the parking lot where the edge analytics IoT camera 101 is installed on the basis of the captured image and the like, and the use fee management unit 291 sets the use fee according to the use status. The parking lot information management unit 161 includes the set use fee in the parking lot information, and registers and manages the parking lot information in the parking lot information database 153. With the configuration, a load on the edge analytics IoT camera 101 regarding the setting of the use fee can be reduced.

6. Sixth Embodiment

<Commerce Transaction System>

The above description has been made using the parking lot reservation system as an example. However, the present technology can be applied to any information processing system.

Figure 26:
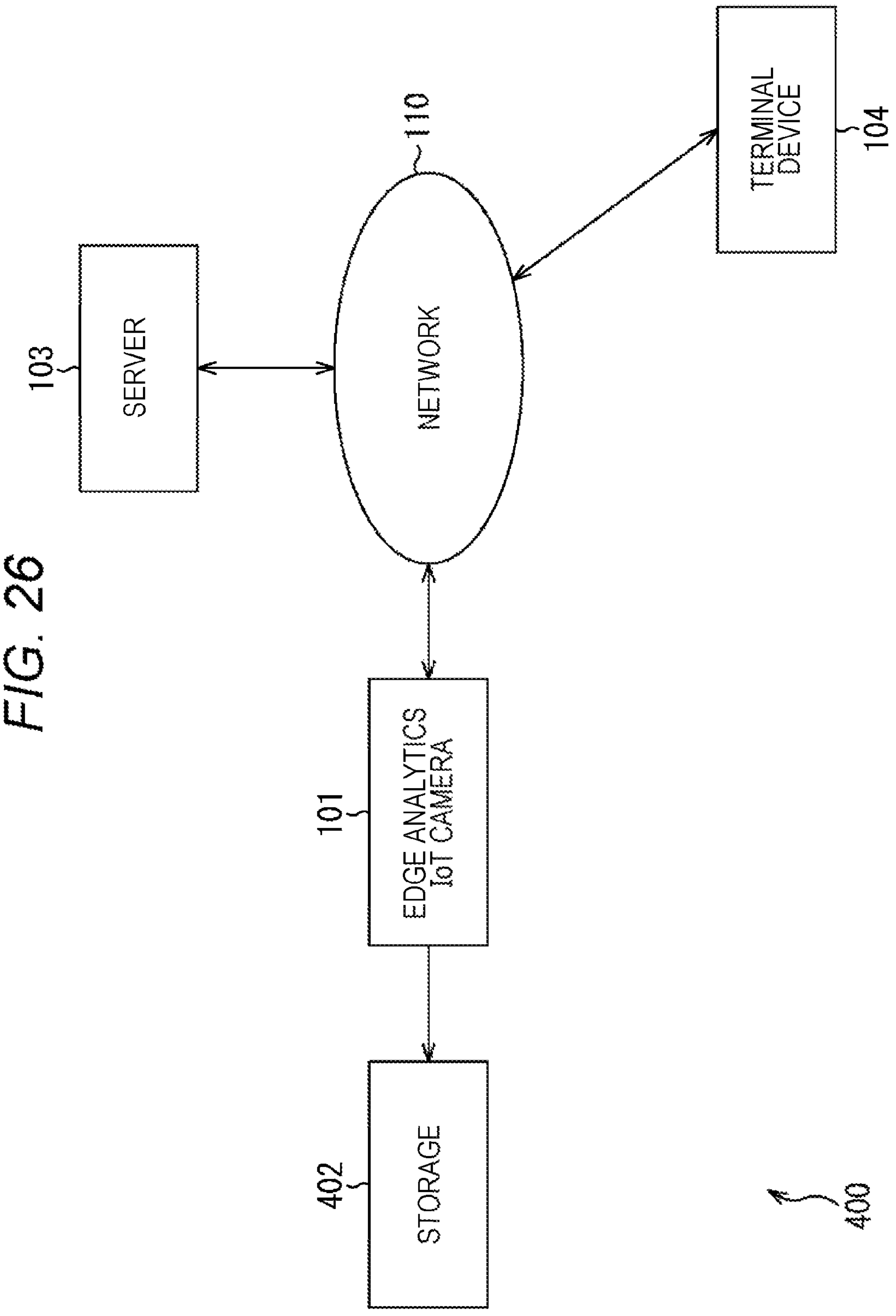
FIG. 26 is a diagram illustrating a main configuration example of a commerce transaction system.

For example, the present technology can be applied to a commerce transaction system in which a product is purchased in advance on an application and the purchased product is received at a drive-through. FIG. 26 is a block diagram illustrating an example of a main configuration of a commerce transaction system that is a mode of an information processing system to which the present technology is applied. A commerce transaction system 400 illustrated in FIG. 26 is a system for performing a commerce transaction, as described above.

As illustrated in FIG. 26, the commerce transaction system 400 includes an edge analytics IoT camera 101, a storage 402, a server 103, and a terminal device 104. That is, the commerce transaction system 400 includes the storage 402 instead of the gate device 102 of the parking lot reservation system 100 in FIG. 1. In the commerce transaction system 400, the respective numbers of devices are arbitrary, as in the case of the parking lot reservation system 100 in FIG. 1.

Figure 27:
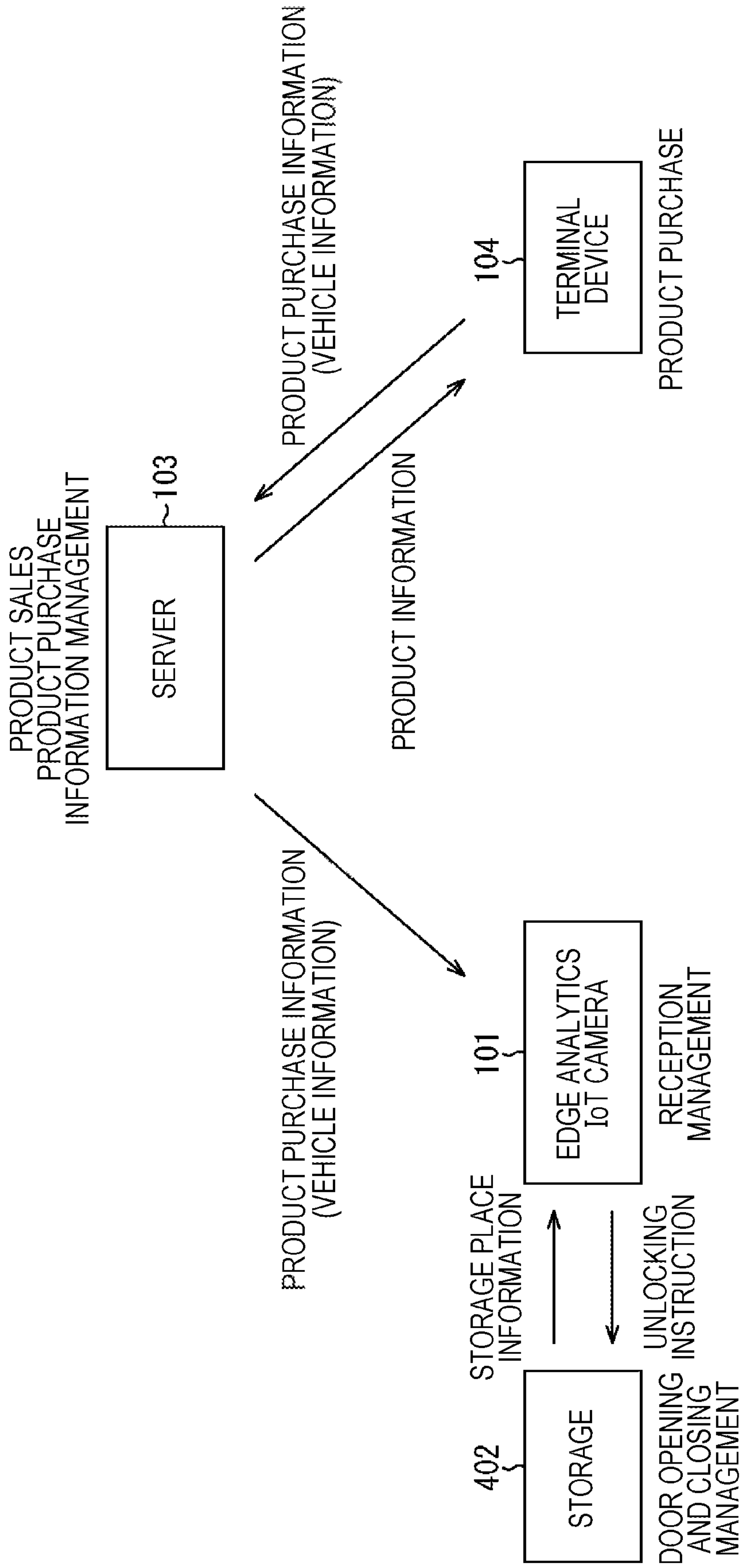
FIG. 27 is a diagram for describing processing performed by each device and examples of information exchanged between the devices.

For example, as illustrated in FIG. 27, the terminal device 104 of the commerce transaction system 400 accesses the server 103 and obtains information regarding products (product information). A user of the terminal device 104 selects a product to be purchased from an application via the terminal device 104 on the basis of the product information. The terminal device 104 performs processing regarding purchase of the product. Then, the terminal device 104 transmits product purchase information to the server 103 that manages the product purchase. Note that the product purchase information includes vehicle information that is information regarding a vehicle for receiving the product.

The server 103 performs processing regarding sale of the product and receives the product purchase information. The server 103 manages the product purchase information. Furthermore, the server 103 supplies the product purchase information (including the vehicle information) to the edge analytics IoT camera 101.

Furthermore, a product seller places the purchased product in the storage 402 installed as a receiving place on a drive-through route, and locks the storage so that a third party does not take the product without permission. Storage place information indicating the storage place and the like is supplied from the storage 402 to the edge analytics IoT camera 101.

The edge analytics IoT camera 101 acquires and manages the product purchase information and the storage place information. Furthermore, the edge analytics IoT camera 101 captures an image of a vehicle near the storage 402, and determines whether or not the vehicle is a vehicle of a product purchaser on the basis of a vehicle registration number. In a case where the vehicle is the vehicle of the product purchaser, the edge analytics IoT camera 101 instructs the storage 402 to unlock. The storage 402 unlocks according to the instruction. Thereby, the user can receive the product in the storage.

<Edge Analytics IoT Camera>

Figure 28:
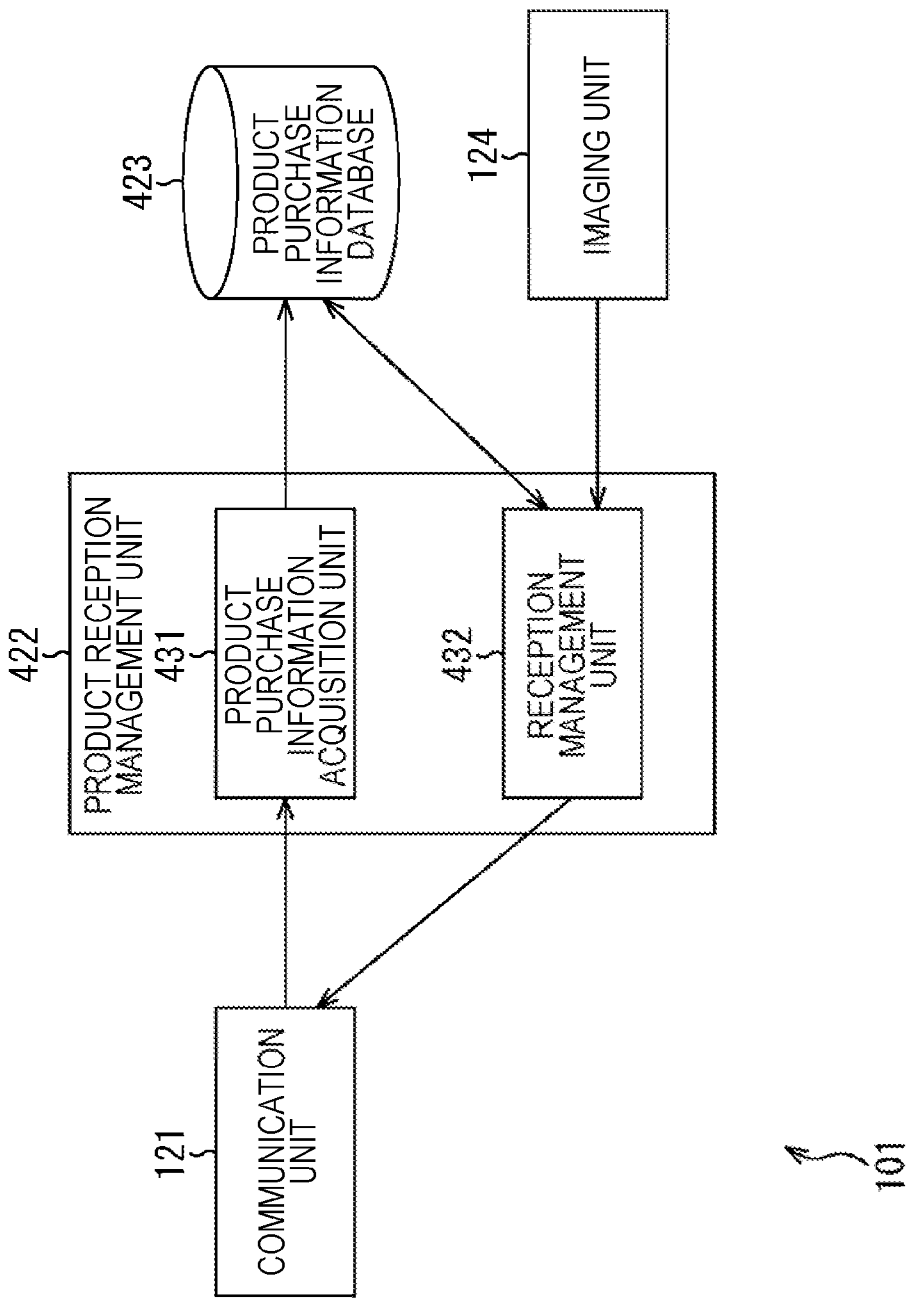
FIG. 28 is a block diagram illustrating a main configuration example of an edge analytics IoT camera.

FIG. 28 is a block diagram illustrating a main configuration example of the edge analytics IoT camera 101. The edge analytics IoT camera 101 in this case includes a product reception management unit 422 instead of the parking lot management unit 122 of the configuration (FIG. 3) of the edge analytics IoT camera 101 of the first embodiment. Furthermore, the edge analytics IoT camera 101 includes a product purchase information database 423 instead of the reservation information database 123.

The product reception management unit 422 performs processing regarding reception of a product. For example, the product reception management unit 422 includes a product purchase information acquisition unit 431 and a reception management unit 432. The product purchase information acquisition unit 431 acquires the product purchase information supplied from the server 103 via a communication unit 121. Furthermore, the product purchase information acquisition unit 431 registers and manages the product purchase information in the product purchase information database 423.

The reception management unit 432 performs processing regarding reception of a product. For example, the reception management unit 432 analyzes a captured image and detects vehicle information included in the captured image, searches for the product purchase information corresponding to the detected vehicle information, and controls the storage 402 via the communication unit 121 in a case where there is such product purchase information to unlock the storage 402 corresponding to the product purchase information.

<Storage>

Figure 29:
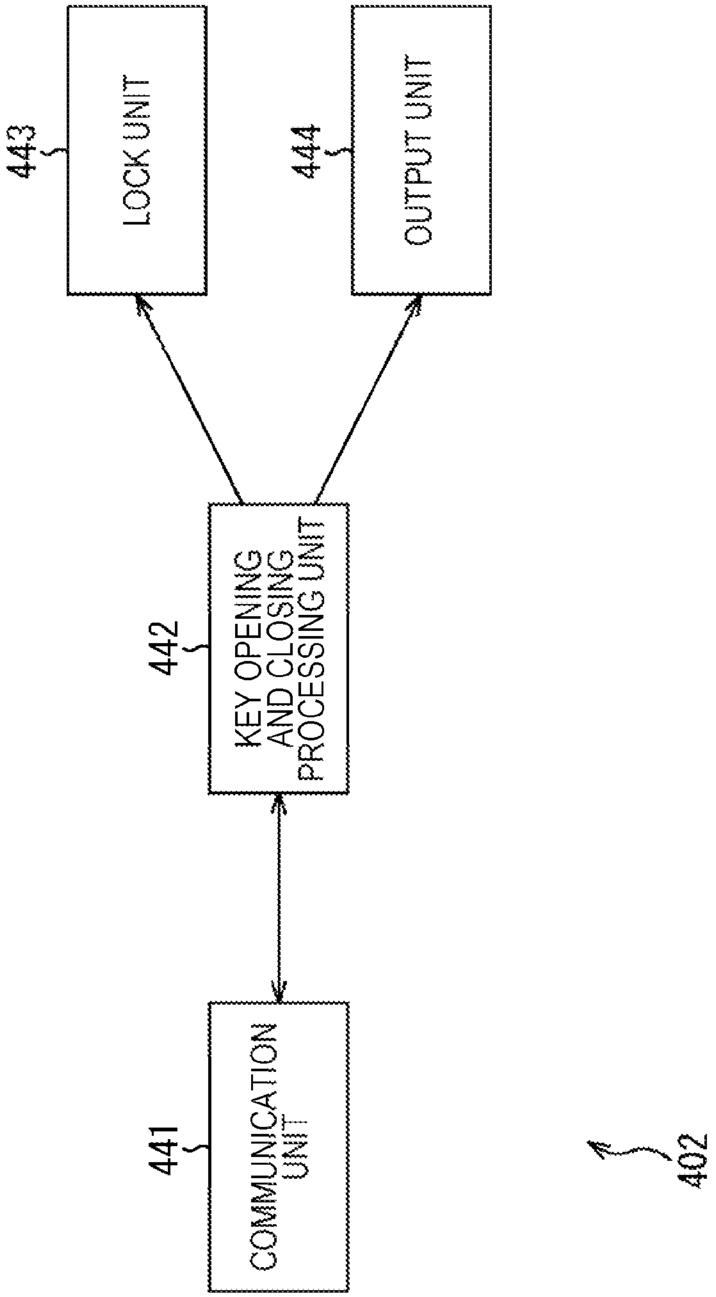
FIG. 29 is a block diagram illustrating a main configuration example of a storage.

FIG. 29 is a block diagram illustrating a main configuration example of the storage 402. Note that FIG. 29 illustrates main processing units, data flows, and the like, and those illustrated in FIG. 29 are not necessarily everything. That is, in the storage 402, there may be a processing unit not illustrated as a block in FIG. 29 or processing or data flow not illustrated as an arrow or the like in FIG. 29.

As illustrated in FIG. 29, the storage 402 includes a communication unit 441, a key opening and closing processing unit 442, a lock unit 443, and an output unit 444.

The communication unit 541 performs communication with another device by an arbitrary communication method using wired communication, wireless communication, or both of the wired and wireless communication and exchanges information.

The key opening and closing processing unit 442 performs processing regarding opening and closing of a key to a door of the storage (that is, locking and unlocking of the door). The lock unit 443 includes an actuator, for example, and controls the locking and unlocking of the door. Furthermore, the output unit 444 includes an information output device such as a monitor and a speaker, and outputs images and sounds. The key opening and closing processing unit 442 controls the lock unit 443 and the output unit 444 on the basis of control information regarding opening and closing of the key supplied from the edge analytics IoT camera 101 via the communication unit 441 to open and close the key to the door of the storage (that is, lock and unlock the door) and to output images and sounds of a guidance or the like. Note that each of these processing units (the communication unit 441 to the output unit 444) of the storage 402 can have an arbitrary configuration. For example, each processing unit may be configured by a logic circuit that implements the above-described processing. Furthermore, each processing unit may include, for example, a CPU, a ROM, a RAM, and the like, and implement the above-described processing by executing a program using the above resources. Of course, each processing unit may have both the configurations and implement part of the above-described processing by the logic circuit and implement the other of the processing by executing the program. The configurations of the processing units may be independent of one another. For example, some of the processing units may implement part of the above-described processing by the logic circuit, some of the processing units may implement the above-described processing by executing the program, and some of the processing units may implement the above-described processing by both the logic circuit and execution of the program.

<Server>

Figure 30:
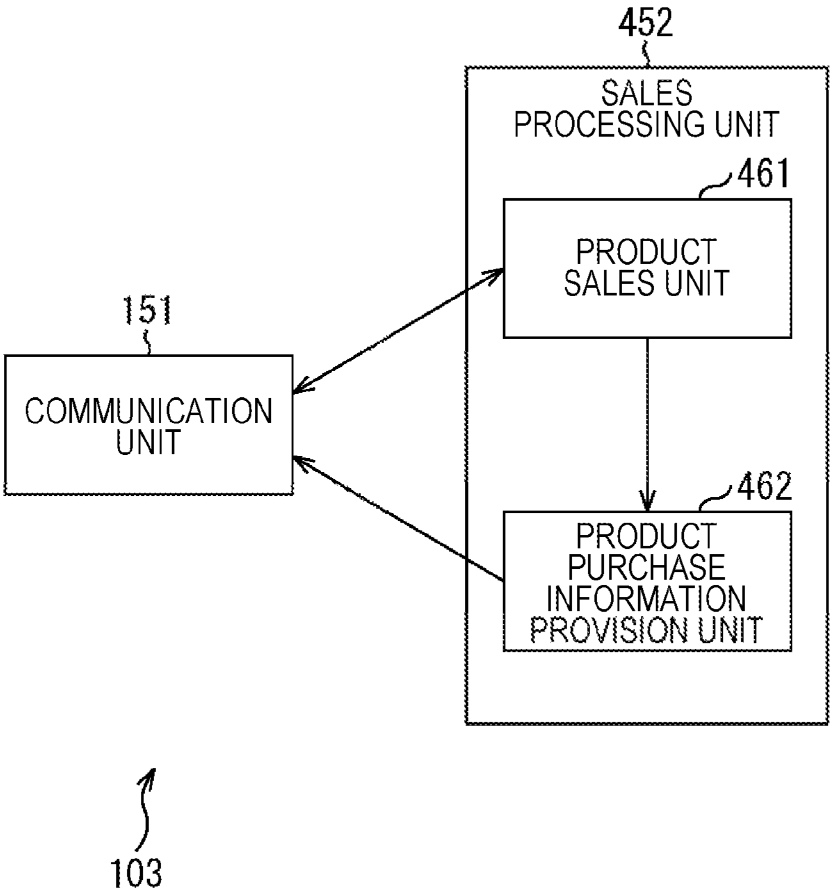
FIG. 30 is a block diagram illustrating a main configuration example of a server.

FIG. 30 is a block diagram illustrating a main configuration example of the server 103 in this case. In this case, the server 103 includes a communication unit 151 and a sales processing unit 452. The sales processing unit 452 performs processing regarding product sales.

The sales processing unit 452 includes a product sales unit 461 and a product purchase information provision unit 462. The product sales unit 461 performs processing of selling a product to a user of the terminal device 104. Furthermore, the product sales unit 461 acquires the product purchase information from the terminal device 104 for the sold product. The product purchase information provision unit 462 supplies the product purchase information to the edge analytics IoT camera 101.

<Terminal Device>

Figure 31:
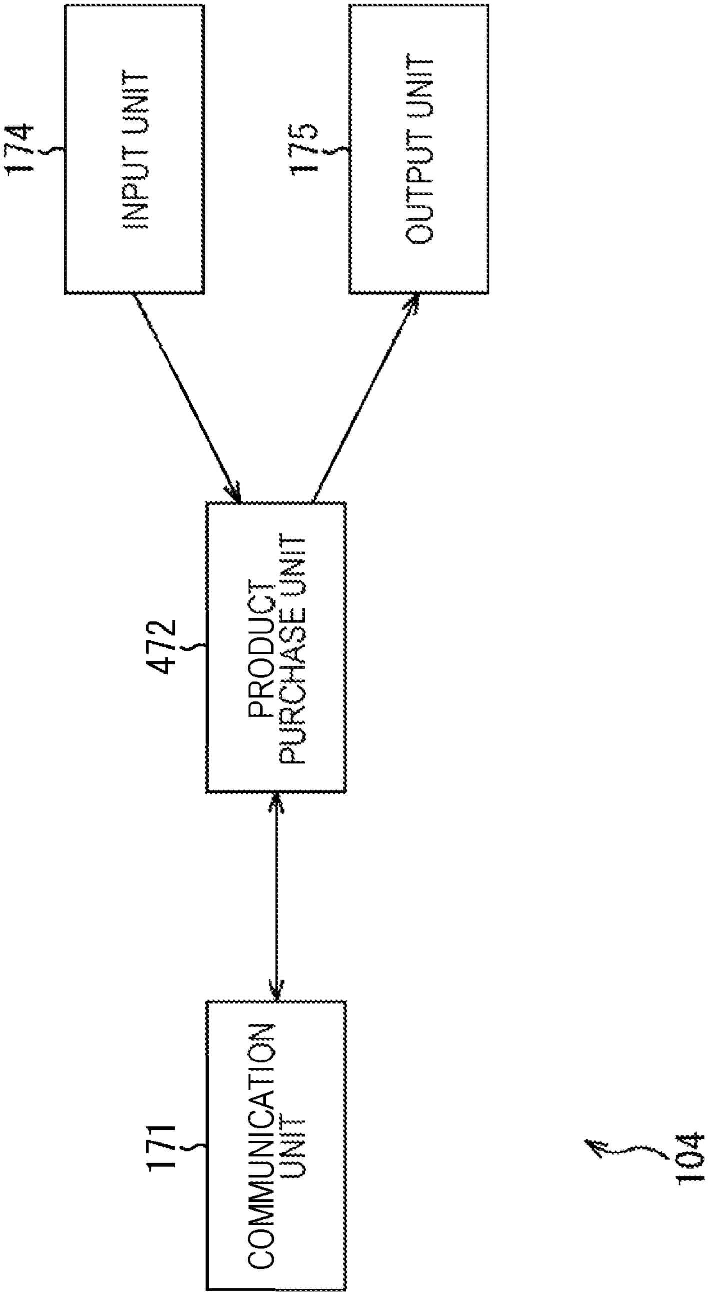
FIG. 31 is a block diagram illustrating a main configuration example of a terminal device.

FIG. 31 is a block diagram illustrating a main configuration example of the terminal device 104 in this case. In this case, the terminal device 104 includes a product purchase unit 472 instead of the reservation processing unit 172 and the settlement processing unit 173 in the case of the first embodiment.

The product purchase unit 472 performs processing regarding product purchase. For example, the product purchase unit 472 transmits the product purchase information to the server 103.

<Product Reception Management Processing>

Figure 32:
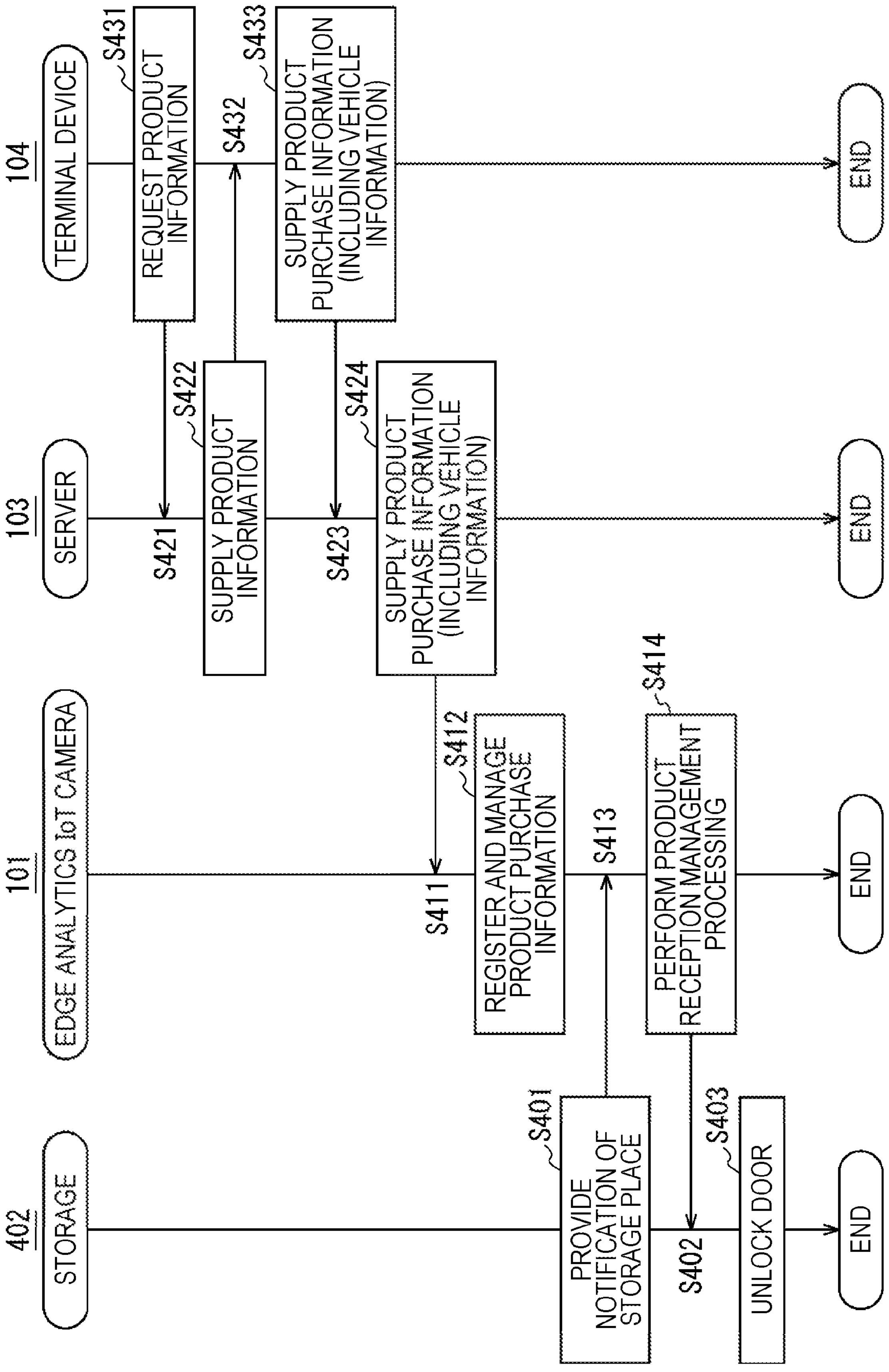
FIG. 32 is a flowchart for describing an example of a flow of commerce transaction processing.

Next, an example of a flow of product reception management processing executed by the commerce transaction system 400 in this case will be described with reference to the flowchart in FIG. 32.

When the product reception management processing is started, the product purchase unit 472 of the terminal device 104 requests the server 103 to send product information via the communication unit 171 in step S431. In step S422, when receiving the request in step S421, the product sales unit 461 of the server 103 supplies the product information to the terminal device 104. In step S432, the product purchase unit 472 of the terminal device 104 receives the product information. The user performs a procedure of product purchase on the basis of the product information.

In step S433, the product purchase unit 472 supplies the product purchase information that is information regarding the product purchase to the server 103. The product purchase information includes the vehicle information of the vehicle to be used for receiving the product.

In step S423, the product sales unit 461 of the server 103 receives the product purchase information.

Furthermore, in step S424, the product purchase information provision unit 462 supplies the product purchase information to the edge analytics IoT camera 101.

In step S411, the product purchase information acquisition unit 431 of the edge analytics IoT camera 101 acquires the product purchase information. The product purchase information includes the vehicle information of the vehicle to be used by the product purchaser to receive the product.

In step S412, the product purchase information acquisition unit 431 registers and manages the acquired product purchase information in the product purchase information database 423.

Furthermore, in step S401, when the seller stores the product and locks the storage 402, the key opening and closing processing unit 442 of the storage 402 notifies the edge analytics IoT camera 101 of the storage place. In step S413, the reception management unit 432 of the edge analytics IoT camera 101 receives the notification.

In step S414, the reception management unit 432 of the edge analytics IoT camera 101 performs the product reception management processing and supplies an unlocking instruction to the storage 402.

In step S402, the key opening and closing processing unit 442 acquires the unlocking instruction. In step S403, the key opening and closing processing unit 442 controls the lock unit 443 to unlock according to the instruction. Thereby, the product purchaser can receive the product that the product purchaser has purchased from the unlocked storage 402.

<Flow of Product Reception Management Processing>

Figure 33:
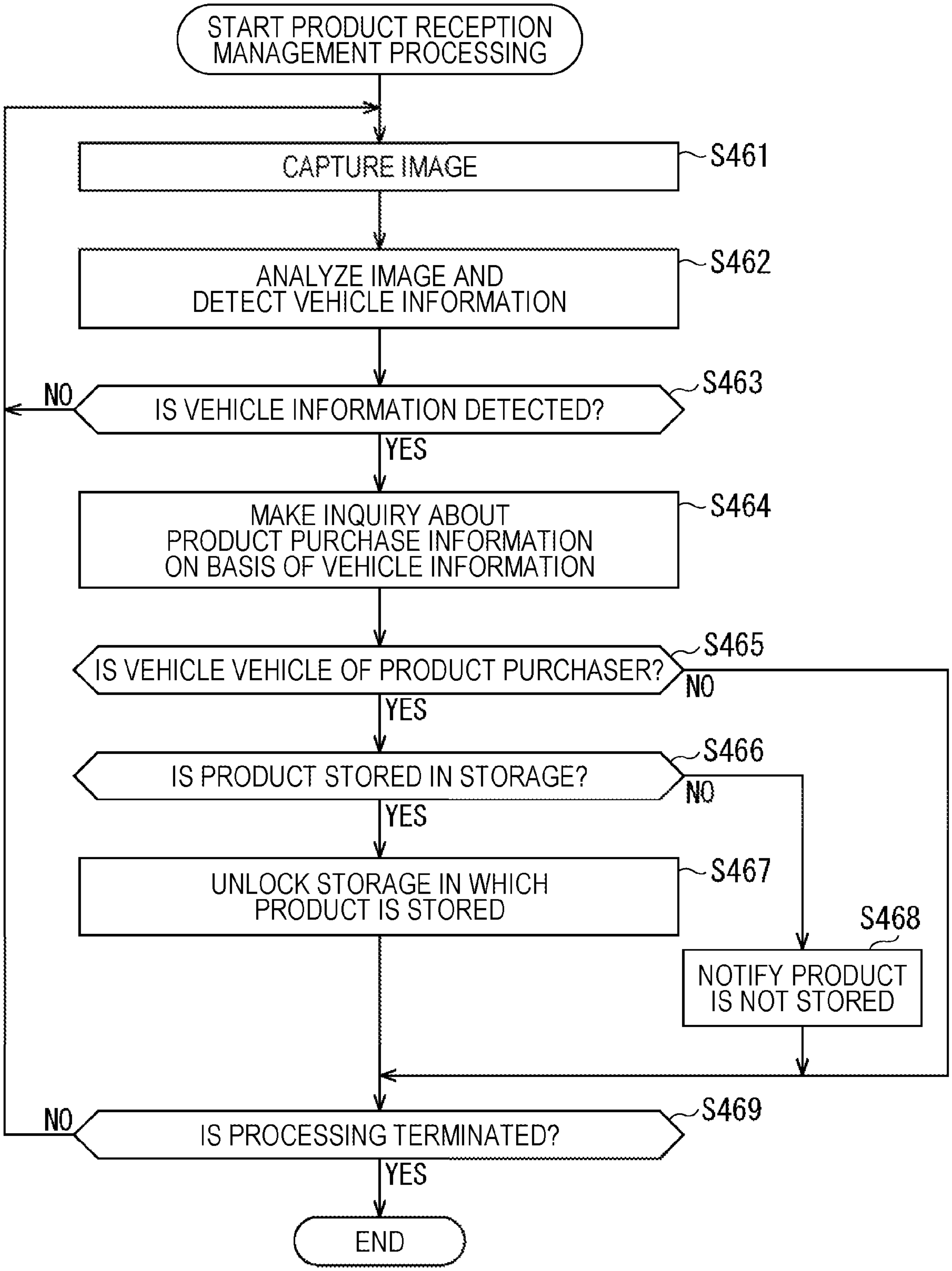
FIG. 33 is a flowchart for describing an example of a flow of product reception management processing.

Next, an example of a flow of the product reception management processing, for example, executed in step S414 in FIG. 32 will be described with reference to the flowchart in FIG. 33.

When the product reception management processing is started, processing in steps S461 to S463 is similarly executed to the processing in steps S191 to S193 (FIG. 9) of the entry management processing.

In step S464, the reception management unit 432 inquires of the product purchase information database 423 the product purchase information on the basis of the detected vehicle information. For example, the reception management unit 432 determines whether or not a vehicle registration number included in each product purchase information matches a vehicle registration number detected from the captured image In a case where there is the product purchase information corresponding to the detected vehicle information, the reception management unit 432 reads the product purchase information from the product purchase information database 423.

In step S465, the reception management unit 432 determines whether or not a vehicle appearing in the captured image is the vehicle of the product purchaser on the basis of the inquiry result. In a case where there is the product purchase information corresponding to the vehicle information detected from the captured image, and the product purchase information is read from the product purchase information database 423, the reception management unit 432 determines that the vehicle appearing in the captured image is the vehicle of the product purchaser and advances the processing to step S466. In step S466, the reception management unit 432 determines whether or not the product corresponding to the product purchase information is stored in the storage 402. In a case where it is determined that the product is stored, the processing proceeds to step S467. In step S467, the reception management unit 432 controls the storage 402 to unlock the storage where the product is stored. When the processing in step S467 is completed, the processing proceeds to step S469.

Furthermore, in step S468, in a case where it is determined that the product is not stored in the storage 402, the processing proceeds to step S468. In step S468, the reception management unit 432 controls the storage 402 to provide notification of the fact from the output unit 444 using images and sounds. When the processing in step S468 is completed, the processing proceeds to step S469.

Moreover, in step S465, in a case where it is determined that the vehicle is not the vehicle of the product purchaser or no vehicle is detected, the processing proceeds to step S469.

In step S469, the reception management unit 432 determines whether or not to terminate the product reception management processing. In a case where it is determined not to terminate the product reception management processing, the processing returns to step S461 and the processing in step S461 and subsequent steps is repeated. Furthermore, in step S469, in a case where it is determined to terminate the product reception management processing, the product reception management processing is terminated.

By executing each processing as described above, management of delivery of a product can be performed. Therefore, complicated work by the product seller becomes unnecessary, and an increase in cost can be suppressed. Furthermore, an increase in load on the product seller can be suppressed.

7. Appendix

<Computer>

Figure 34:
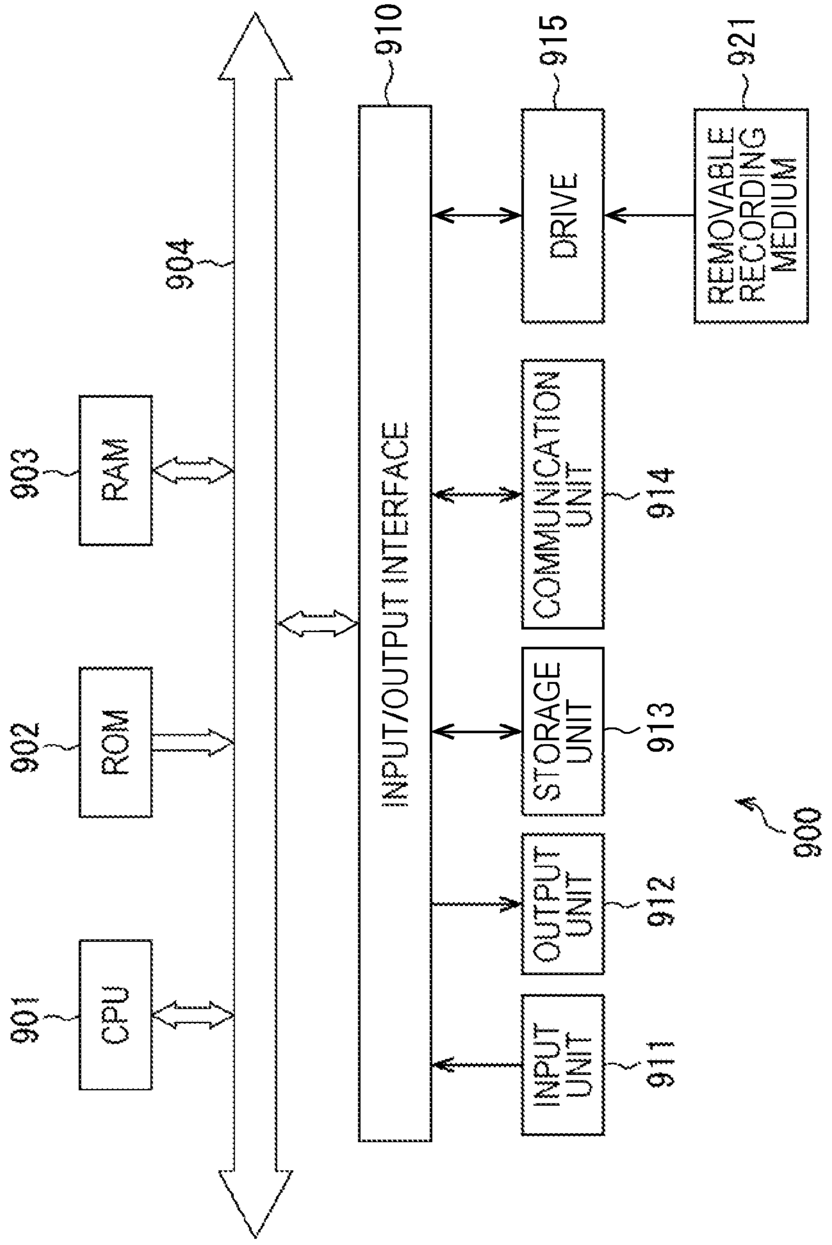
FIG. 34 is a block diagram illustrating a main configuration example of a computer.

The above-described series of processing can be executed by hardware or by software. In the case of executing the series of processing by software, a program that configures the software is installed in a computer. Here, the computer includes a computer incorporated in dedicated hardware, a computer, for example, general-purpose personal computer, capable of executing various functions by installing various programs, and the like. FIG. 34 is a block diagram illustrating a configuration example of hardware of a computer that executes the above-described series of processing by a program.

In a computer 900 illustrated in FIG. 34, a central processing unit (CPU) 901, a read only memory (ROM) 902, and a random access memory (RAM) 903 are mutually connected by a bus 904.

An input/output interface 910 is also connected to the bus 904. An input unit 911, an output unit 912, a storage unit 913, a communication unit 914, and a drive 915 are connected to the input/output interface 910. The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface. The drive 915 drives a removable recording medium 921 such as a magnetic disk, an optical disk, a magneto-optical disk, or a semiconductor memory. In the computer configured as described above, the CPU 901 loads, for example, a program stored in the storage unit 913 into the RAM 903 and executes the program via the input/output interface 910 and the bus 904, so that the above-described series of processing is performed. Furthermore, the RAM 903 appropriately stores data and the like necessary for the CPU 901 to execute the various types of processing.

The program to be executed by the computer can be recorded and applied on the removable recording medium 921 as a package medium or the like, for example, and can be provided. In that case, the program can be installed to the storage unit 913 via the input/output interface 910 by attaching the removable recording medium 921 to the drive 915.

Furthermore, this program can be provided via a wired or wireless transmission medium such as a local area network, the Internet, or digital satellite broadcast. In that case, the program can be received by the communication unit 914 and installed in the storage unit 913.

Other than the above method, the program can be installed in the ROM 902 or the storage unit 913 in advance.

<Applicable Object of Present Technology>

Note that the systems, apparatuses, processing units, and the like to which the present technology is applied can be used in arbitrary fields such as traffic, medical care, crime prevention, agriculture, livestock industry, mining, beauty, factory, household appliance, weather, and natural surveillance, for example. Furthermore, uses in the arbitrary fields are also arbitrary.

For example, the present technology can be applied to systems and devices provided for providing content for appreciation and the like. Furthermore, for example, the present technology can also be applied to systems and devices used for traffic, such as traffic condition monitoring and automatic driving control. Moreover, for example, the present technology can also be applied to systems and devices provided for security. Furthermore, for example, the present technology can be applied to systems and devices provided for automatic control of machines and the like. Moreover, for example, the present technology can also be applied to systems and devices provided for agriculture or livestock industry. Furthermore, the present technology can also be applied to systems and devices that monitor nature states such as volcanoes, forests, and ocean, wildlife, and the like. Moreover, for example, the present technology can also be applied to systems and devices provided for sports.

<Others>

Embodiments of the present technology are not limited to the above-described embodiments, and various modifications can be made without departing from the gist of the present technology.

For example, the present technology can be implemented as any configuration constituting a device or a system, such as a processor as a system large scale integration (LSI) or the like, a module using a plurality of processors or the like, a unit using a plurality of modules or the like, or a set in which other functions are added to the unit (that is, a configuration of a part of the device), for example.

Furthermore, the above-described each processing unit can be implemented by an arbitrary configuration. For example, the each processing unit may be configured by a circuit, an LSI, a system LSI, a processor, a module, a unit, a set, a device, an apparatus, a system, or the like. Furthermore, a plurality of the aforementioned configurations may be combined. At this time, for example, the same type of configurations such as a plurality of circuits or a plurality of processors may be combined, or different types of configurations such as a circuit and an LSI may be combined.

Note that, in this specification, the term "system" means a group of a plurality of configuration elements (devices, modules (parts), and the like), and whether or not all the configuration elements are in the same casing is irrelevant. Therefore, a plurality of devices housed in separate housings and connected via a network, and one device that houses a plurality of modules in one casing are both systems.

Further, for example, the configuration described as one device (or processing unit) may be divided into and configured as a plurality of devices (or processing units). On the contrary, the configuration described as a plurality of devices (or processing units) may be collectively configured as one device (or processing unit). Furthermore, a configuration other than the above-described configuration may be added to the configuration of each device (or each processing unit). Moreover, a part of the configuration of a certain device (or processing unit) may be included in the configuration of another device (or another processing unit) as long as the configuration and operation of the system as a whole are substantially the same.

Further, for example, in the present technology, a configuration of cloud computing in which one function is shared and processed in cooperation by a plurality of devices via a network can be adopted. For example, the present technology can be applied to a cloud service that provides a service regarding a captured image (moving image) to an arbitrary terminal such as a computer, an audio visual (AV) device, a portable information processing terminal, or an internet of things (IoT) device.

Furthermore, for example, the above-described program can be executed by an arbitrary device. In that case, the device is only required to have necessary functions (functional blocks and the like) and obtain necessary information.

Further, for example, the steps described in the above-described flowcharts can be executed by one device or can be executed by a plurality of devices in a shared manner. Moreover, in the case where a plurality of processes is included in one step, the plurality of processes included in the one step can be executed by one device or can be shared and executed by a plurality of devices. In other words, the plurality of processes included in one step can be executed as processes of a plurality of steps. Conversely, the processing described as a plurality of steps can be collectively executed as one step.

In the program executed by the computer, the processing of the steps describing the program may be executed in chronological order according to the order described in the present specification, or may be individually executed in parallel or at necessary timing when a call is made, for example. That is, the processing of each step may be executed in an order different from the above-described order as long as no contradiction occurs. Moreover, the processing of the steps describing the program may be executed in parallel with the processing of another program, or may be executed in combination with the processing of another program.

The plurality of present technologies described in the present specification can be implemented independently of one another as a single unit as long as there is no inconsistency. Of course, an arbitrary number of the present technologies can be implemented together. For example, part or whole of the present technology described in any of the embodiments can be implemented in combination with part or whole of the present technology described in another embodiment. Further, part or whole of the above-described arbitrary present technology can be implemented in combination with another technology not described above.

The present technology can also have the following configurations.

(1) An information processing apparatus including:

an entry and leaving management unit configured to analyze a captured image and detect vehicle information included in the captured image, and in a case where there is reservation information of parking corresponding to the detected vehicle information, open a gate of a parking lot corresponding to the reservation information.

(2) The information processing apparatus according to (1), in which the vehicle information includes a vehicle registration number of a vehicle.

(3) The information processing apparatus according to (1) or (2), in which the reservation information includes vehicle information of a vehicle.

(4) The information processing apparatus according to any one of (1) to (3), further including:

a reservation information storage unit configured to store the reservation information, in which the entry and leaving management unit searches the reservation information stored in the reservation information storage unit for the reservation information corresponding to the vehicle information, using the vehicle information obtained from the captured image, and opens the gate in the case where there is the reservation information corresponding to the vehicle information.

(5) The information processing apparatus according to any one of (1) to (4), further including:

an imaging unit configured to capture an object and generate the captured image, in which the entry and leaving management unit analyzes the captured image generated by the imaging unit and detects the vehicle information, and in the case where there is the reservation information corresponding to the detected vehicle information, opens the gate.

(6) The information processing apparatus according to any one of (1) to (5), in which the entry and leaving management unit determines whether or not current time is entry available time corresponding to the reservation information, and opens the gate in a case where the current time is determined to be the entry available time.

(7) The information processing apparatus according to (6), in which the entry available time is time within a reservation time or time within a predetermined time before reservation time start time.

(8) The information processing apparatus according to (6) or (7), in which the entry and leaving management unit confirms a use status of the parking lot in a case where the current time is determined to be an entry unavailable time, and opens the gate in a case where parking is available.

(9) The information processing apparatus according to any one of (1) to (8), further including:

a provision unit configured to provide information regarding the parking lot necessary for a reservation.

(10) The information processing apparatus according to (9), in which the provision unit provides the information regarding the parking lot according to date and time.

(11) The information processing apparatus according to (9) or (10), further including:

a use status management unit configured to manage a use status of the parking lot, in which the provision unit provides information regarding the use status of the parking lot managed by the use status management unit.

(12) The information processing apparatus according to (11), in which the use status management unit determines and manages the use status of the parking lot on the basis of the captured image and the reservation information.

(13) The information processing apparatus according to (12), in which, in a case where a place is determined that no vehicle is currently parked on the basis of the captured image but the place corresponds to the reservation information that is going to have a reservation time start time within a predetermined time, the use status management unit determines that the place is not available.

(14) The information processing apparatus according to (12) or (13), in which, in a case where a place is determined that no vehicle is currently parked on the basis of the captured image, and in a case where a predetermined time or more has passed from a reservation time start time of the reservation information corresponding to the place, the use status management unit determines that the place is available.

(15) The information processing apparatus according to any one of (11) to (14), further including:

a use fee management unit configured to manage a use fee of the parking lot according to the use status of the parking lot, in which the provision unit provides information regarding the use fee of the parking lot managed by the use fee management unit.

(16) The information processing apparatus according to (15), in which the use fee management unit reduces the use fee as a use rate of the parking lot decreases.

(17) The information processing apparatus according to any one of (1) to (16), further including:

a communication unit configured to perform communication with another device and exchanges information, in which the entry and leaving management unit opens the gate in a case where the reservation information supplied from the another device via the communication unit corresponds to the detected vehicle information.

(18) An information processing method including:

analyzing a captured image and detecting vehicle information included in the captured image, and in a case where there is reservation information of parking corresponding to the detected vehicle information, opening a gate of a parking lot corresponding to the reservation information.

(19) A program for causing a computer to function as:

an entry and leaving management unit configured to analyze a captured image and detect vehicle information included in the captured image, and in a case where there is reservation information of parking corresponding to the detected vehicle information, open a gate of a parking lot corresponding to the reservation information.

(20) An information processing system including:

a terminal device;

a server;

a parking lot management device; and a gate device, the terminal device including a reservation processing unit configured to reserve, using vehicle information, parking of a vehicle corresponding to the vehicle information, the server including a reservation information management unit configured to register reservation information corresponding to the vehicle information generated by the terminal device, and supply the reservation information to the parking lot management device of a parking lot specified by the reservation information, the parking lot management device including an imaging unit configured to capture an image and generate a captured image, and an entry and leaving management unit configured to analyze the captured image and detect vehicle information included in the captured image, acquire the reservation information supplied from the server, and open a gate of the gate device in a case where there is the reservation information corresponding to the detected vehicle information in the acquired reservation information, and the gate device including a gate opening and closing unit configured to open and close the gate under control of the parking lot management device.

REFERENCE SIGNS LIST

100 Parking lot reservation system
101 Edge analytics IoT camera
102 Gate device
103 Server
104 Terminal device
110 Network
121 Communication unit
122 Parking lot management unit
123 Reservation information database
124 Imaging unit
131 Reservation information management unit
132 Entry and leaving management unit
141 Communication unit
142 Gate processing unit
143 Gate drive unit
144 Output unit
151 Communication unit
152 Parking lot arrangement processing unit
153 Parking lot information database
154 Reservation information database
161 Parking lot information management unit
162 Reservation management unit
163 Charge processing unit
171 Communication unit
172 Reservation processing unit
173 Settlement processing unit
174 Input unit
175 Output unit
231 Time management unit
232 Vacant space search unit
251 Parking lot information provision unit
252 Time management unit
271 Use status management unit
291 Use fee management unit
400 Commerce transaction system
402 Storage
422 Product reception management unit
423 Product purchase information database
431 Product purchase information acquisition unit
432 Reception management unit
441 Communication unit
442 Key opening and closing processing unit
443 Lock unit
444 Output unit
452 Sales processing unit
461 Product sales unit
462 Product purchase information provision unit
472 Product purchase unit

The invention claimed is:

1. An information processing apparatus, comprising:

entry and leaving management circuitry configured to analyze a captured image and detect vehicle information included in the captured image, and in a case where there is reservation information of parking corresponding to the detected vehicle information, open a gate of a parking lot corresponding to the reservation information, wherein the entry and leaving management circuitry is further configured to determine whether or not a current time corresponds to an entry available time corresponding to the reservation information, and open the gate in a case where the current time is determined to correspond to the entry available time.

2. The information processing apparatus according to claim 1, wherein the vehicle information includes a vehicle registration number of a vehicle.

3. The information processing apparatus according to claim 1, wherein the reservation information includes vehicle information of a vehicle.

4. The information processing apparatus according to claim 1, further comprising:

reservation information storage circuitry configured to store the reservation information, wherein the entry and leaving management circuitry is further configured to search the reservation information stored in the reservation information storage circuitry for the reservation information corresponding to the vehicle information, using the vehicle information obtained from the captured image, and open the gate in the case where there is the reservation information corresponding to the vehicle information.

5. The information processing apparatus according to claim 1, further comprising:

imaging circuitry configured to capture an object and generate the captured image, wherein the entry and leaving management circuitry is further configured to analyze the captured image generated by the imaging circuitry and detect the vehicle information, and in the case where there is the reservation information corresponding to the detected vehicle information, open the gate.

6. The information processing apparatus according to claim 1, wherein the entry available time is a time within a reservation time or a time within a predetermined time before reservation time start time.

7. The information processing apparatus according to claim 1, wherein the entry and leaving management circuitry is further configured to confirm a use status of the parking lot in a case where the current time is determined to be entry unavailable time, and open the gate in a case where parking is available.

8. The information processing apparatus according to claim 1, further comprising:

provision circuitry configured to provide information regarding the parking lot necessary for a reservation.

9. The information processing apparatus according to claim 8, wherein the provision circuitry is further configured to provide the information regarding the parking lot according to date and time.

10. An information processing apparatus, comprising:

entry and leaving management circuitry configured to analyze a captured image and detect vehicle information included in the captured image, and in a case where there is reservation information of parking corresponding to the detected vehicle information, open a gate of a parking lot corresponding to the reservation information;

provision circuitry configured to provide information regarding the parking lot corresponding to a reservation; and use status management circuitry configured to manage a use status of the parking lot, wherein the provision circuitry provides information regarding the use status of the parking lot managed by the use status management circuitry.

11. The information processing apparatus according to claim 10, wherein the use status management circuitry is further configured to determine and manage the use status of the parking lot on a basis of the captured image and the reservation information.

12. The information processing apparatus according to claim 11, wherein, in a case where a place is determined that no vehicle is currently parked on a basis of the captured image but the place corresponds to the reservation information that is going to have a reservation time start time within a predetermined time, the use status management circuitry is further configured to determine that the place is not available.

13. The information processing apparatus according to claim 11, wherein, in a case where a place is determined that no vehicle is currently parked on a basis of the captured image, and in a case where a predetermined time or more has passed from a reservation time start time of the reservation information corresponding to the place, the use status management circuitry is further configured to determine that the place is available.

14. The information processing apparatus according to claim 10, further comprising:

use fee management circuitry configured to manage a use fee of the parking lot according to the use status of the parking lot, wherein the provision circuitry is further configured to provide information regarding the use fee of the parking lot managed by the use fee management circuitry.

15. The information processing apparatus according to claim 14, wherein the use fee management circuitry is further configured to decrease the use fee as a use rate of the parking lot becomes lower.

16. The information processing apparatus according to claim 1, further comprising:

communication circuitry configured to perform communication with another device and exchange information, wherein the entry and leaving management circuitry is further configured to open the gate in a case where the reservation information supplied from the another device via the communication circuitry corresponds to the detected vehicle information.

17. A non-transitory computer readable medium storing instruction which when executed by a processor causes the processor to perform a method, the method comprising:

analyzing a captured image and detecting vehicle information included in the captured image;

in a case where there is reservation information of parking corresponding to the detected vehicle information, opening a gate of a parking lot corresponding to the reservation information;

determining whether or not a current time corresponds to an entry available time corresponding to the reservation information; and opening the gate in a case where the current time is determined to correspond to the entry available time.

18. The non-transitory computer readable medium according to claim 17, the method further comprising:

storing the reservation information;

searching the reservation information stored corresponding to the vehicle information; and using the vehicle information obtained from the captured image, opening the gate in the case where there is the reservation information corresponding to the vehicle information.

19. A non-transitory computer readable medium storing instruction which when executed by a processor cause the processor to perform a method, the method comprising:

analyzing a captured image and detecting vehicle information included in the captured image;

in a case where there is reservation information of parking corresponding to the detected vehicle information, opening a gate of a parking lot corresponding to the reservation information;

providing information regarding the parking lot corresponding to a reservation; and managing a use status of the parking lot, the information regarding the use status of the parking lot.

20. The non-transitory computer readable medium according to claim 19, the method further comprising managing a use fee of the parking lot according to the use status of the parking lot.

* * * * *